US011529701B2

(12) United States Patent
Määttänen et al.

(10) Patent No.: US 11,529,701 B2
(45) Date of Patent: Dec. 20, 2022

(54) METHOD AND APPARATUS FOR PRODUCING A HERMETIC VACUUM JOINT AT LOW TEMPERATURE

(71) Applicant: Schott Primoceler Oy, Tampere (FI)

(72) Inventors: Antti Määttänen, Tampere (FI); Juha Tolppa, Tampere (FI)

(73) Assignee: Schott Primoceler Oy, Tampere (FI)

( * ) Notice: Subject to any disclaimer, the term of this patent is extended or adjusted under 35 U.S.C. 154(b) by 404 days.

(21) Appl. No.: 16/612,992

(22) PCT Filed: May 17, 2018

(86) PCT No.: PCT/FI2018/050366
§ 371 (c)(1),
(2) Date: Nov. 12, 2019

(87) PCT Pub. No.: WO2018/211176
PCT Pub. Date: Nov. 22, 2018

(65) Prior Publication Data
US 2021/0078104 A1 Mar. 18, 2021

(30) Foreign Application Priority Data
May 19, 2017 (FI) .................................. 20175456

(51) Int. Cl.
*B23K 26/24* (2014.01)
*B23K 26/12* (2014.01)
(Continued)

(52) U.S. Cl.
CPC .......... *B23K 26/24* (2013.01); *B23K 26/1224* (2015.10); *B23K 26/206* (2013.01); *B23K 2103/54* (2018.08)

(58) Field of Classification Search
CPC .............. B23K 26/206; B23K 2103/54; B23K 26/1224; B23K 26/24
(Continued)

(56) References Cited

U.S. PATENT DOCUMENTS 3,382,343 A * 5/1968 Muncheryan ........ B23K 26/703
219/121.79
4,879,450 A 11/1989 Valentin et al.
(Continued)

FOREIGN PATENT DOCUMENTS

CN 103123983 A 5/2013
GB 1345126 A 1/1974
(Continued)

OTHER PUBLICATIONS

European Patent Office, Extended European Search Report, Application No. 18801810.5, dated Feb. 25, 2021, 8 pages.
(Continued)

*Primary Examiner* — Jimmy Chou
(74) *Attorney, Agent, or Firm* — Ziegler IP Law Group, LLC

(57) ABSTRACT

An article is produced by welding a first piece to a second piece by a laser beam. The first piece includes an open cavity and a first sealing surface. The second piece has a second sealing surface. The first piece and second piece are inside chamber with a controllable internal pressure that is changed to cause a flow of a gas from the open cavity. The open cavity is closed by moving at least one of the pieces. The first sealing surface forms a partially gas tight preliminary joint with the second sealing surface. The first piece and the second piece define an interface. The chamber is opened after the preliminary joint has been formed. A welded seam is formed by focusing a laser beam to the interface after the
(Continued)

chamber is opened. The first sealing surface and the second sealing surface are substantially planar.

12 Claims, 10 Drawing Sheets

(51) Int. Cl.
*B23K 103/00* (2006.01)
*B23K 26/20* (2014.01)

(58) Field of Classification Search
USPC ..................................... 219/121.63, 121.64
See application file for complete search history.

(56) References Cited

U.S. PATENT DOCUMENTS

| | | | | |
|---|---|---|---|---|
| 5,096,518 | A * | 3/1992 | Fujikawa | B23K 15/0053 419/68 |
| 5,407,119 | A * | 4/1995 | Churchill | C04B 37/006 228/232 |
| 5,879,416 | A * | 3/1999 | Nakamura | B23K 26/28 29/623.2 |
| 7,168,935 | B1 * | 1/2007 | Taminger | B23K 15/0073 264/408 |
| 8,546,717 | B2 * | 10/2013 | Stecker | B23K 15/02 219/121.13 |
| 8,957,345 | B2 * | 2/2015 | Karst | G01L 23/10 228/178 |
| 2004/0011773 | A1 * | 1/2004 | Fritz | B23K 26/03 219/121.64 |
| 2004/0072053 | A1 * | 4/2004 | Schlag | H01M 8/0267 429/510 |
| 2004/0207314 | A1 * | 10/2004 | Aitken | C03C 27/005 313/504 |
| 2005/0082265 | A1 * | 4/2005 | Yamabuki | B29C 66/9241 219/121.64 |
| 2005/0218123 | A1 * | 10/2005 | Hayakawa | B29C 66/53461 219/121.64 |
| 2009/0280349 | A1 * | 11/2009 | Bittendorfer | B23K 26/242 219/121.13 |
| 2011/0036817 | A1 * | 2/2011 | Ehrmann | B29C 66/131 219/121.64 |
| 2017/0077543 | A1 * | 3/2017 | Umeyama | B23K 26/206 |
| 2018/0093345 | A1 * | 4/2018 | Yamagishi | B23K 26/244 |
| 2018/0093423 | A1 * | 4/2018 | Yamagishi | B29C 66/53461 |
| 2018/0351130 | A1 * | 12/2018 | Boek | B23K 26/24 |
| 2019/0022782 | A1 * | 1/2019 | Dejneka | B32B 17/06 |
| 2021/0273282 | A1 * | 9/2021 | Kang | B23K 26/24 |
| 2022/0055150 | A1 * | 2/2022 | Takemoto | B23K 26/127 |

FOREIGN PATENT DOCUMENTS

| | | | |
|---|---|---|---|
| JP | S59191587 | A | 10/1984 |
| JP | 07176329 | A * | 7/1995 |
| JP | 3017922 | B2 | 3/2000 |
| JP | 2004172206 | A | 6/2004 |
| JP | 2007216301 | A | 8/2007 |
| JP | 2011210431 | A | 10/2011 |
| JP | 2012104397 | A | 5/2012 |
| WO | 2010086072 | A1 | 8/2010 |
| WO | 2012094737 | A1 | 7/2012 |
| WO | 2013008724 | A1 | 1/2013 |

OTHER PUBLICATIONS

Japan Patent Office, Notice of Reasons for Rejection, Application No. 2020514348, dated Jan. 26, 2021, 6 pages.
Walter W. Duley, "Laser Welding" Copyright 1999 by John Wiley & Sons, Inc. ISBN 0-471-24679-4, 4 pages.
International Search Report, Application No. PCT/FI2018/050366, dated Jun. 29, 2018, 4 pages.
Japan Patent Office, Notice of Reasons for Rejection, Application No. 2020-514348, dated Sep. 28, 2021, 8 pages.

* cited by examiner

METHOD AND APPARATUS FOR PRODUCING A HERMETIC VACUUM JOINT AT LOW TEMPERATURE

FIELD

Some embodiments relate to forming a hermetically sealed cavity.

BACKGROUND

An optical or electrical article may comprise a hermetically sealed cavity, which contains a sensitive electrical component. The hermetically sealed cavity may e.g. protect the sensitive electrical component from atmospheric humidity. It is known that a hermetically sealed cavity may be formed by positioning a layer of filler material between a first glass piece and a second glass piece, and by heating the combination in an oven. The filler material may be molten in the oven and subsequently cooled to hermetically join the first glass piece to the second glass piece.

SUMMARY

Some embodiments may relate to a method for forming an article, which comprises a hermetically sealed cavity. Some embodiments may relate to an apparatus for forming an article, which comprises a hermetically sealed cavity. Some embodiments may relate to an article, which comprises a hermetically sealed cavity.

According to an aspect, there is provided a method for producing an article (100) by welding a first piece (110) to a second piece (120), the method comprising:
providing the first piece (110), which comprises an open cavity (OCA1) and a first sealing surface (SRF1),
providing the second piece (120), which comprises a second sealing surface (SRF2),
providing a chamber (200), which has controllable internal pressure ($p_2$),
closing the chamber (200) such that the first piece (110) and the second piece (120) are inside the closed chamber (200),
changing the internal pressure ($p_2$) of the chamber (200) so as to cause a flow (F1) of a gas (GAS1) from the open cavity (OCA1),
closing the open cavity (OCA1) by moving at least one of the pieces (110, 120) such that the first sealing surface (SRF1) forms a preliminary joint (S0) together with the second sealing surface (SRF2), and such that the first piece (110) and the second piece (120) define an interface (IF1),
opening the chamber (200) after the preliminary joint (S0) has been formed, and
forming a welded seam (J1) by focusing a laser beam (B1) to the interface (IF1) after the chamber (200) has been opened.

According to an aspect, there is provided an apparatus (700) for producing an article (100) from a first piece (110) and from a second piece (120), wherein the first piece (110) comprises an open cavity (OCA1) and a first sealing surface (SRF1), the second piece (120) comprises a second sealing surface (SRF2), the apparatus (700) comprising a chamber (200) and a laser welding unit (500), wherein the apparatus (700) is arranged to:
cause a flow (F1) of a gas (GAS1) from the open cavity (OCA1) by changing the internal pressure ($p_2$) of the chamber (200) when the pieces (110, 120) are located in the in the closed chamber (200),
move at least one of the pieces (110, 120) in the closed chamber (200) so as to close the open cavity (OCA1) such that the first sealing surface (SRF1) forms a preliminary joint (S0) together with the second sealing surface (SRF2), and such that the first piece (110) and the second piece (120) define an interface (IF1), and
form a welded seam (J1) by focusing a laser beam (B1) to the interface (IF1) after the chamber (200) has been opened.

The first sealing surface and the second sealing surface may be substantially planar.

The first sealing surface may form a partially gas tight preliminary joint together with the second sealing surface.

The pressure of the cavity may be reduced by using the chamber. The chamber may be called e.g. as a vacuum chamber. The laser welding may take place after the vacuum chamber has been opened such that the vacuum chamber does not restrict positioning of the laser welding unit with respect to the pieces. In particular, the laser welding may take place outside the vacuum chamber. The method may facilitate focusing of the laser beam to desired points of the common interface of the pieces. The pieces may be welded together with the focused laser beam such that there is no need to guide the laser beam into the vacuum chamber. The method may provide substantial freedom to move the laser welding unit with respect to the semi-manufactured article during forming the hermetic seam. For example, it is not necessary to guide the laser beam through a wall of the chamber.

The article may be formed substantially without heating the surface of the cavity. This may facilitate e.g. hermetic encapsulation of a sensitive component inside the cavity. This may increase operating reliability of the component encapsulated in the cavity. The temperature of the surface of the cavity may remain lower than e.g. 80° C. during forming the seam e.g. in order to reduce the probability of damaging the component. The temperature of the surface of the cavity may remain lower than 80° C. during forming the seam in order to improve operating reliability of the component. The temperature of the surface of the cavity may remain substantially equal to the normal room temperature (e.g. near 25° C.) during forming the seam.

It is not necessary to spend time for heating and/or cooling the pieces. The method may allow production of articles at a high rate. Keeping the temperature of the cavity below the predetermined limit may reduce or minimize the risk of releasing harmful substances from the pieces to the hermetically sealed cavity.

At least one of the pieces may be substantially transparent at the wavelength of the laser beam. At least one of the pieces may be substantially transparent in the infrared, visible and/or ultraviolet wavelength range, so as to allow transmission of the laser beam through the piece to the interface.

The material of the first piece may be e.g. glass, silicon, sapphire, or ceramic. The material of the second piece may be e.g. glass, silicon, sapphire, or ceramic. The use of these materials may provide a dimensionally stable and gas-tight hermetic structure. The permeability of glass to gases may be substantially lower than the permeability of plastics or the permeability of epoxy resins, for example.

The use of glass, silicon, sapphire, and/or ceramic and keeping the temperature of the pieces below a predetermined limit may reduce or minimize the risk of releasing harmful substances from the material of the piece to the hermetically sealed cavity and/or to a component enclosed in the cavity. The use of glass, silicon, sapphire, and/or ceramic and keeping the temperature of the pieces below a predetermined limit may reduce or minimize the risk of releasing a harmful substance out of the sealed cavity. The use of glass, silicon, sapphire, and/or ceramic and keeping the temperature of the pieces below a predetermined limit may reduce or minimize the risk of releasing a harmful substance out of a component enclosed in the cavity. Outgassing may be reduced or eliminated.

The welded seam may be formed from the material of the first piece and from the material of the second piece without using a filler material between the pieces. The article may be manufactured by using a reduced number of materials. The welded seam may fully encircle the cavity so as to provide a hermetically sealed structure.

The laser beam may cause localized fusion of the mating surfaces of the pieces such that a large portion of the mating surfaces may remain solid during the welding. A large portion of the mating surfaces may remain solid during the welding such that the dimensions of the article are not changed due to the welding. Consequently, the final thickness of the article may be accurately defined by the initial dimensions of the pieces.

The pressure difference between exterior and interior of the article may hold the second piece in place during the laser welding such that it is not necessary to press the second piece against the first piece by a pressing tool during the laser welding. Performing the welding without the pressing tool may provide increased freedom to select the position of the laser welding unit with respect to the pieces. Said pressure difference may also reduce or minimize internal stresses of the article, thereby increasing the operating reliability of the produced article.

Keeping the temperature of the pieces near an intended operating temperature of the article during the laser welding may reduce internal stress of the pieces and may improve operating reliability of the article e.g. when the thermal expansion coefficient of the material of the first piece is substantially different from the thermal expansion coefficient of the material of the second piece. The ratio of the thermal expansion coefficient of the material of the first piece to the thermal expansion coefficient of the material of the second piece may be e.g. lower than ⅓ or higher than 3. The intended operating temperature may be e.g. substantially equal to the room temperature (e.g. 25° C.).

BRIEF DESCRIPTION OF THE DRAWINGS

In the following examples, several variations will be described in more detail with reference to the appended drawings, in which.

DETAILED DESCRIPTION

Figure 1A:
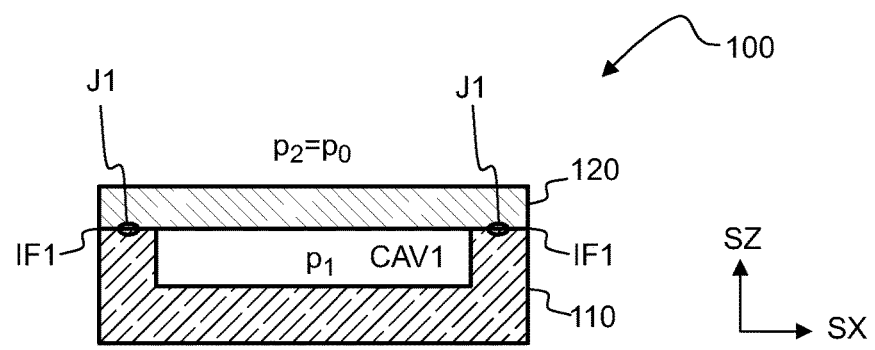
FIG. 1a shows, by way of example, in a cross-sectional view, an article, which comprises a hermetically closed cavity.

Referring to FIG. 1a, the produced article 100 may comprise a hermetically closed cavity CAV1. The article 100 may be produced by welding a first piece 110 to a second piece 120 with a laser beam. The first piece 110 may be joined to the second piece 120 by a welded seam J1. $p_1$ may denote the internal pressure of the cavity CAV1. $p_2$ may denote the external pressure of gas on the outer surface of the article 100. The pressure $p_2$ may be equal to the ambient pressure $p_0$, e.g. substantially equal to 100 kPa.

The article 100 may be a device. The article 100 may be e.g. an optical device and/or an electronic device.

SX, SY and SZ denote orthogonal directions.

Figure 1B:
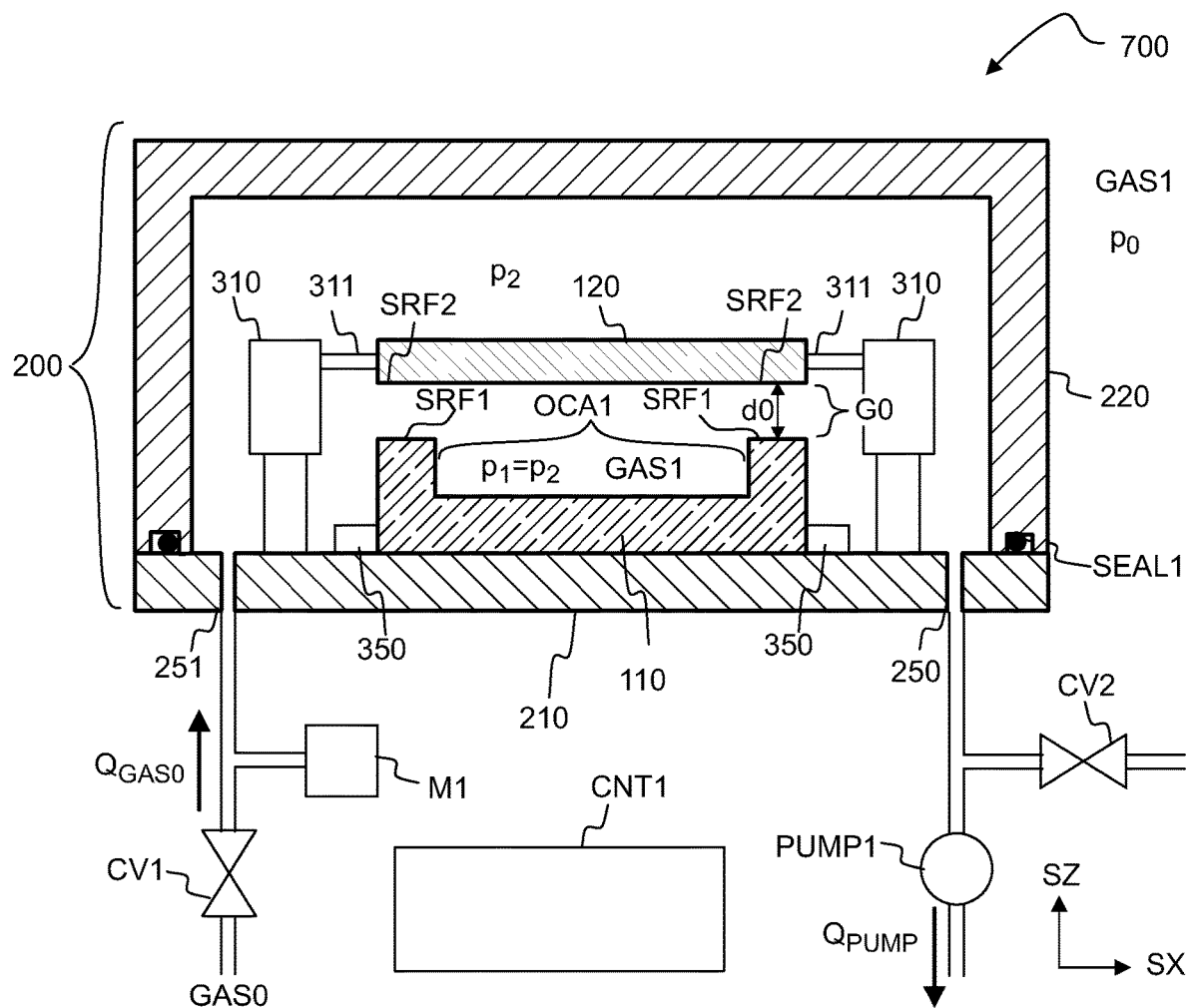
FIG. 1b shows, by way of example, in a cross-sectional view, an apparatus for changing pressure of an open cavity of a piece of the article.

Referring to FIG. 1b, a production apparatus 700 may be arranged to produce the article 100 by altering internal pressure of a vacuum chamber and by using laser welding.

The apparatus 700 may be arranged to produce the article 100 by welding a first piece 110 to a second piece 120. The first piece 110 may have a first sealing surface SRF1, and the second piece 120 may have a second sealing surface SRF2. The first piece 110 may comprise e.g. glass, silicon, sapphire and/or a ceramic material. The second piece 120 may comprise e.g. glass, silicon, sapphire and/or a ceramic material. The sealing surface SRF1 may consist essentially of glass, silicon, sapphire and/or a ceramic material. The sealing surface SRF2 may consist essentially of glass, silicon, sapphire and/or a ceramic material.

The apparatus 700 may comprise e.g. a base 210 and a cover 220. The base 210 may operate as a part of a low pressure chamber 200. The low pressure chamber 200 may also be called e.g. as a vacuum chamber.

The article 100 may comprise the first piece 110 and the second piece 120. The first piece 110 may have a first sealing surface SRF1, and the second piece 120 may have a second sealing surface SRF2. The piece 110 and/or 120 may initially comprise one or more open cavities OCA1. The first piece 110 may have a concave portion, which may at least partly define a closed cavity CAV1 when the second piece 120 is pressed against the first piece 110. The second piece 120 may be positioned with respect to the first piece 110 such that the cavity is initially open. The open cavity OCA1 may be converted into a closed cavity CAV1 by closing the open cavity OCA1. The geometry of the pieces 110, 120 may be selected such that the open cavity OCA1 may be converted into a closed cavity by bringing the first sealing surface SRF1 of the first piece 110 into contact with the second sealing surface SRF2 of the second piece 120. The second sealing surface SRF2 may be positioned against the first sealing surface SRF1 e.g. by moving the second piece 120 with respect to the first piece 110.

Figure 1C:
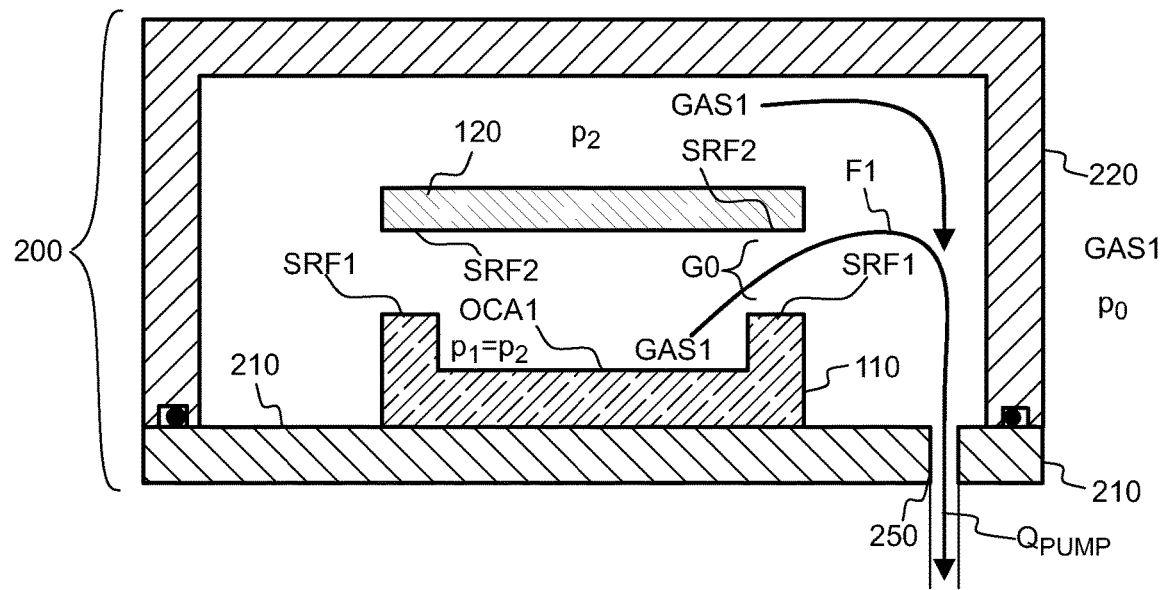
FIG. 1c shows, by way of example, in a cross-sectional view, removing gas from the open cavity of the piece.

G0 denotes a gap between the first sealing surface SRF1 and the second sealing surface SRF2. d0 denotes the height of the gap G0. The gap G0 may allow a flow F1 of a gas GAS1 (or GAS0) from the open cavity OCA1 through the gap G0 (FIG. 1c). An initial position of the second piece 120 may be selected such that the cavity OCA1 is open when the pressure of the chamber is reduced. An initial position of the second piece 120 may be selected such that there is a gap G0 between a portion of the first sealing surface SRF1 and a portion of the second sealing surface SRF2. The height d0 may be greater than zero. The height d0 may be e.g. greater than 1 mm, or even greater than 10 mm.

$p_1$ may denote gas pressure of the cavity OCA1, CAV1 at a first side of the piece 120. $p_2$ may denote gas pressure at the second (other) side of the piece 120. The pressure $p_1$ may be called e.g. as cavity pressure, and the pressure $p_2$ may be called e.g. as external pressure. $p_0$ may denote an ambient pressure. The external pressure $p_2$ may be substantially equal to the ambient pressure $p_0$ when the vacuum chamber is open. The ambient pressure $p_0$ may be e.g. in the range of 90 kPa to 110 kPa. The ambient pressure $p_0$ may be substantially equal to the atmospheric pressure. The ambient pressure $p_0$ may be e.g. substantially equal to 100 kPa.

The pieces 110, 120 may be initially surrounded with a gas GAS1. The cavity OCA1 may be initially filled with the gas GAS1. The gas GAS1 may be e.g. air. The gas GAS1 may also be e.g. inert gas, e.g. Argon or nitrogen. The pieces 110, 120 may be initially surrounded with inert gas GAS1. For example, the apparatus 700 may be arranged to operate in a room or confined space, which is filled with the inert gas GAS1.

The first piece 110 may be supported e.g. by the base 210. The position of the first piece 110 may be optionally defined with respect to the base 210 e.g. by using one or more positioning elements 350. One or more positioning elements 350 may be optionally arranged to operate as clamps. The piece 110 may be optionally clamped to the base 210 e.g. by one or more clamping elements 350. The base 210 may optionally comprise e.g. a recess (not shown) to define the transverse position of the piece 110 with respect to the base 210. The use of the clamping elements or recess is not necessary. The first piece 110 may be kept stationary with respect to the base 210 also without clamping the first piece 110. The piece 110 may also be held in place e.g. by gravity and friction.

The apparatus 700 may comprise one or more actuators 310. The one or more actuators 310 may be arranged to close the cavity by moving the first piece 110 and/or by moving the second piece 120. The one or more actuators 310 may be arranged to cause a relative movement between the first piece 110 and the second piece 120 when the chamber 200 is closed. The second piece 120 may be temporarily supported by one or more supporting elements 311. The supporting elements 311 may also be called e.g. as contact elements. The cavity CAV1 may be closed by moving one or more contact elements 311. The second piece 120 may be brought into contact with the first piece 110 by moving one or more contact elements 311. The apparatus 700 may comprise one or more actuators 310 for moving the contact elements 311. The actuators 310 may comprise contact elements 311 for contacting with the second piece 120. The piece 120 may be supported by one or more contact elements 311. The second piece 120 may be temporarily clamped by using one or more contact elements 311. The piece may be clamped between two or more contact elements 311.

The first piece 110 may comprise one or more open cavities OCA1 and/or the second piece 110 may comprise one or more open cavities OCA1. The first piece 110 and/or the second piece 120 may comprise one or more concave portions to define one or more open cavities OCA1.

The chamber 200 may comprise the base 210 and a cover 220. The chamber 200 may be closed e.g. by moving the cover 220 with respect to the base 210. The chamber 200 may be closed such that the first piece 110 and the second piece 120 remain inside the chamber 200.

The chamber 200 may comprise one or more openings 250, 251 for guiding gas out of the chamber 200. The chamber 200 may optionally comprise one or more openings 250, 251 for guiding gas into the chamber 200.

The apparatus 700 may comprise a pump PUMP1 for removing gas from the chamber 200. The pump PUMP1 may cause a gas flow $Q_{PUMP}$ out of the chamber 200. The pump PUMP1 may be arranged to reduce the internal pressure $p_2$ of the chamber 200 with respect to the ambient pressure $p_0$.

The apparatus 700 may comprise a pressure sensor M1 for monitoring pressure inside the chamber 200.

The production apparatus 700 may optionally comprise a valve CV1 for controlling a first gas flow $Q_{GAS0}$ of a gas guided into the chamber 200. For example, the valve CV1 may control the flow rate of an inert flushing gas GAS0. The chamber 200 may be optionally flushed with a flushing gas GAS0 before closing the cavity OCA1. The composition of the flushing gas may be selected to provide a desired gas composition in the closed cavity of the article 100. The chamber 200 may be flushed e.g. with inert gas. The inert gas may be e.g. nitrogen ($N_2$) or argon (Ar). The gas may be provided e.g. from a gas cylinder via the valve CV1. The composition of the gas inside the cavity OCA1 may become substantially similar to the composition of the gas GAS0 of flushing gas flow $Q_{GAS0}$.

The apparatus 700 may optionally comprise a valve CV2 for controlling a second gas flow of a gas guided into the chamber 200. For example, the valve CV1 may control the flow rate when the pressure of the chamber is increased, after the cavity has been closed, before opening the chamber.

The apparatus 700 may comprise a control unit CNT1 for controlling operation of the valves CV1, CV2, and for controlling operation of the pump PUMP1. The apparatus 700 may comprise a control unit CNT1 for timing operation of the valves CV1, CV2 and the pump PUMP1. The apparatus 700 may comprise a control unit CNT1 for controlling operation of the valves CV1, CV2 and the pump PUMP1 e.g. based on measured internal pressure of the chamber 200. The apparatus 700 may optionally comprise one or more actuators for opening and/or closing the chamber 200.

The chamber 200 may comprise a sealing SEAL1 to form a pressure tight seal between the base 210 and the cover 220 when the chamber 200 is closed.

Referring to FIG. 1c, gas GAS1 (or GAS0) may be drawn out of the chamber 200 in order to change the internal pressure $p_2$ of the chamber 200 and in order to remove gas from the open cavity OCA1. The pump PUMP1 may draw gas GAS1 out of the chamber 200. Gas GAS1 may be simultaneously drawn out of the open cavity OCA1 and from the interior of the chamber 200. The interior of the open cavity OCA1 may be in fluid communication with the interior of the chamber 200 e.g. via the gap GAP1. The interior of the open cavity OCA1 may be in fluid communication with the interior of the chamber 200. The internal pressure $p_2$ of the chamber 200 may be substantially lower than the ambient pressure $p_0$. The pressure $p_2$ of the open cavity OCA1 may be substantially equal to the internal pressure $p_1$ of the chamber 200. The pressure $p_1$ of the cavity may be changed by changing the internal pressure $p_2$ of the chamber 200.

The internal dimensions of the chamber 200 may be selected according to the external dimensions of the article 100. The internal volume of the chamber 200 may be small when producing a small article 100. Consequently, the internal pressure of the chamber 200 may be reduced at a high rate.

A transverse dimension of the article 100 (e.g. in the direction SX or SY) may be e.g. in the range of 0.5 mm to 500 mm. For example, the transverse dimensions of the article 100 may be e.g. in the order of 1 mm×1 mm. For example a circular silicon wafer may be used as one of the pieces 110, 120. The diameter of the wafer may be e.g. in the range of 50 to 305 mm (2 inch to 12 inch). The thickness (in the direction SZ) of the second piece 120 may be e.g. greater than or equal to 30 µm. The total thickness of the article 100 may be e.g. in the range of 100 µm to 10 m.

Figure 1D:
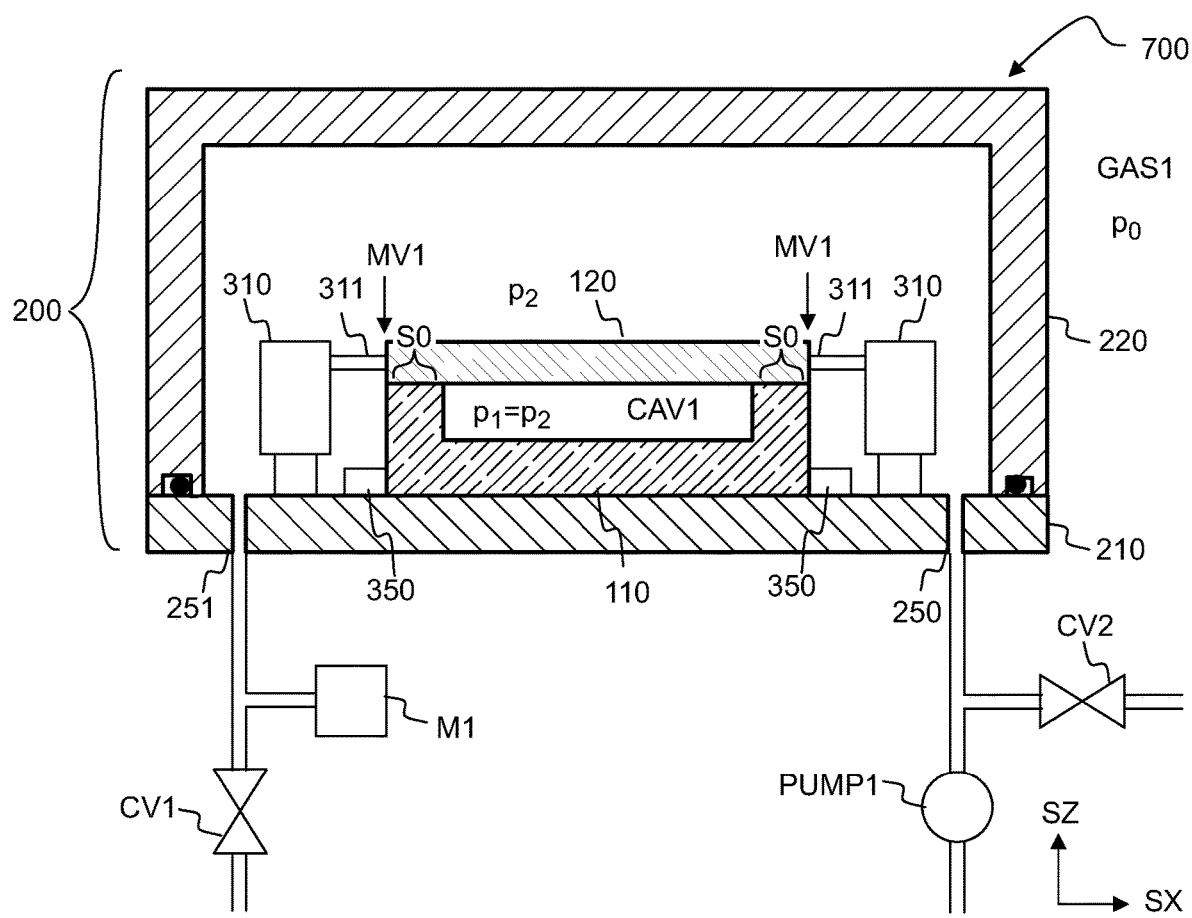
FIG. 1d shows, by way of example, in a cross-sectional view, closing the cavity of the piece.

Referring to FIG. 1d, the gap G0 may be closed by using one or more actuators 310. For example, the actuators 310 may move the second piece 120 with respect to the first piece 110. MV1 may denote a movement of the piece 120. The pressure $p_1$ of the open cavity OCA1 may be substantially equal to the internal pressure $p_2$ of the chamber 200 when the cavity is closed. The internal pressure $p_2$ of the chamber 200 may be substantially lower than the ambient pressure $p_0$ when the gap G0 is closed. The open cavity OCA1 may be converted into a closed cavity CAV1 by covering the open cavity OCA1 by the piece 120. The open cavity OCA1 may be converted into the closed cavity CAV1 by closing the gap G0.

Figure 1E:
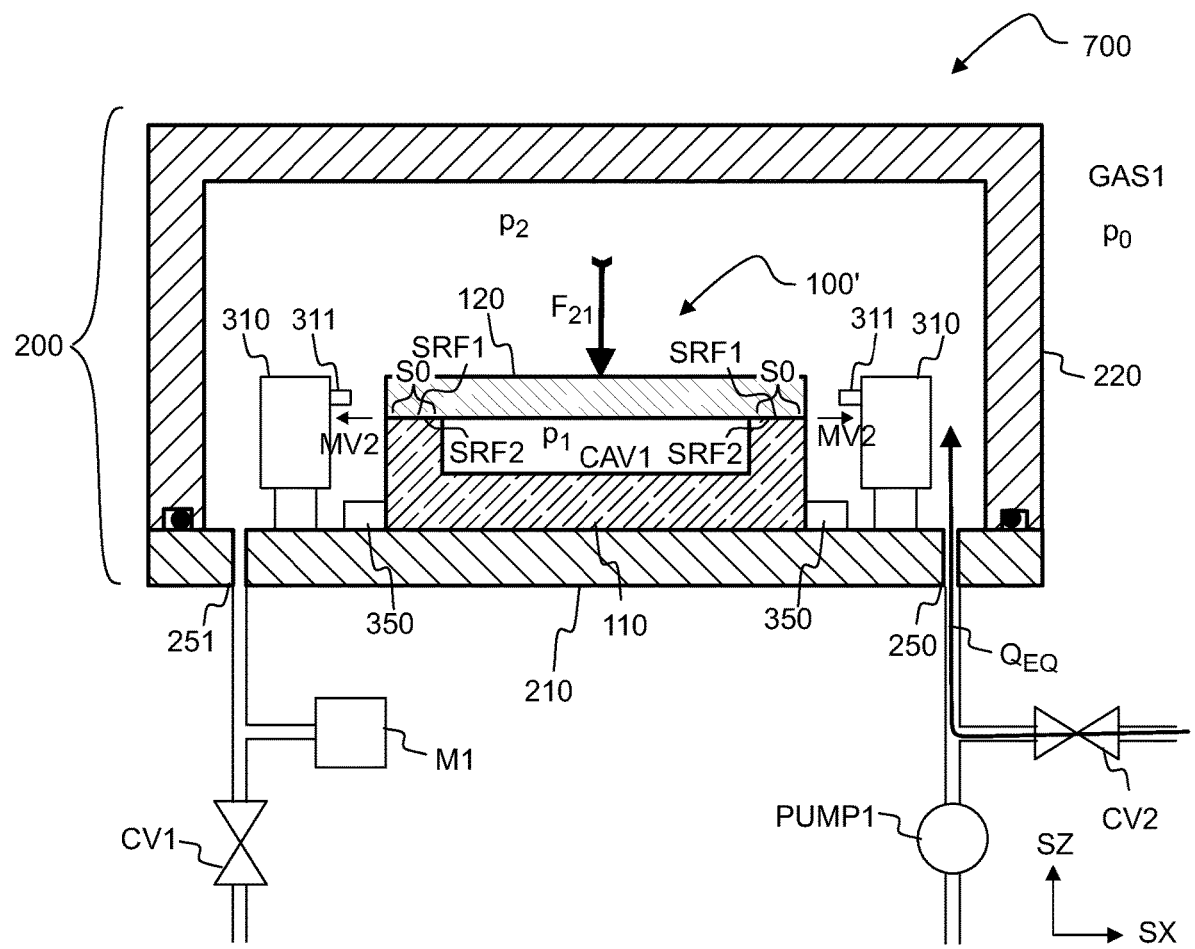
FIG. 1e shows, by way of example, in a cross-sectional view, a preliminary joint formed between a first piece and a second piece of the article.

Referring to FIG. 1e, the internal pressure $p_2$ of the chamber 200 may be increased after the cavity has been closed. The internal pressure $p_2$ of the chamber 200 may be increased before opening the chamber so as to facilitate opening of the chamber 200. For example, a gas flow $Q_{EQ}$ may be guided into the chamber e.g. via a valve CV2. The internal pressure $p_2$ of the chamber 200 may be equalized with the ambient pressure $p_0$. The internal pressure $p_2$ of the chamber 200 may be increased such that the internal pressure $p_2$ of the chamber 200 becomes substantially equal to the ambient pressure $p_0$.

The sealing surface SRF1 of the piece 110 may be in contact with the sealing surface SRF2 of the piece 120 so as to form a preliminary joint S0. The three dimensional shape of the sealing surface SRF1 may substantially match with the three dimensional shape of the sealing surface SRF2 such that the preliminary joint S0 may be gas tight to a certain degree. The preliminary joint S0 may encircle the cavity CAV1. The shape of the surface SRF1 and/or the shape of the surface SRF2 may be substantially planar such that the surfaces SRF1, SRF2 may form a substantially gas-tight temporary joint when the first surface SRF1 is pressed against the second surface SRF2.

The shape of the surface SRF1 may match with the shape of the surface SRF2 such that the surfaces SRF1, SRF2 may together form a temporary substantially gas-tight joint when the first surface SRF1 is pressed against the second surface SRF2. The surface SRF1 may be e.g. planar, spherical or conical. The surface SRF2 may be e.g. planar, spherical or conical. The first surface SRF1 may have e.g. a convex shape to match with a concave shape of the second surface SRF2. The first surface SRF1 may have e.g. a concave shape to match with a convex shape of the second surface SRF2.

For example, the RMS height of the closed gap between the pieces may be smaller than 1.0 µm, advantageously smaller than 0.2 µm. RMS means root mean square. For example, the surface SRF1 and/or the surface SRF2 may be planar surfaces. For example, the flatness of the surface SRF1, SRF2 may be better than 1.0 µm, advantageously better than 0.2 µam.

The preliminary joint S0 between the pieces 110, 120 may be formed without welding and without using an adhesive.

The sealing surface SRF2 may be in contact with the sealing surface SRF1, and the shape of the surface SRF2 may match with the shape of the surface SRF1 such that the second piece 120 may be held against the first piece 110 also by van der Waals forces.

The preliminary joint S0 may allow small relative movement of the surface SRF1 with respect to the surface SRF2. For example, the surface SRF2 may slide by a few micrometers in a transverse direction, with respect to the surface SRF1. The surface SRF2 may slide by a few micrometers in a transverse direction, which is perpendicular to the surface SRF2.

In principle, the piece 120 could also be pulled apart from the piece 110 in order to open the preliminary joint, without causing visually detectable damage to at least one of the pieces 110, 120. The preliminary joint S0 may allow relative movement of the first sealing surface SRF1 with respect to the second sealing surface SRF2 after opening the chamber 200. The preliminary joint S0 may allow relative movement of the first sealing surface SRF1 with respect to the second sealing surface SRF2 before forming the welded seam J1.

The preliminary joint S0 may be gas tight to a certain degree. The internal pressure $p_2$ of the chamber 200 may be increased wherein the pressure $p_1$ of the cavity CAV1 may remain lower than the pressure $p_2$ of the chamber 200. Consequently, the second piece 120 may be held against the first piece 110 also by a pneumatic force $F_{21}$ caused by the pressure difference $p_2-p_1$.

The preliminary joint S0 may allow small relative movement of the surface SRF2 with respect to the surface SRF1 also after opening the chamber, before performing the welding. In case of substantially planar surfaces SRF1, SRF2, the surface SRF1 may be e.g. in a plane defined by the directions SX and SY, and the surface SRF2 may slide along the planar surface SRF1 e.g. in the direction SX. The planar surface SRF2 may be held against the planar surface SRF1 mainly by the pressure difference $p_2-p_1$ such that surface SRF2 could be moved along the planar surface SRF1 e.g. in the direction SX. The planar surface SRF2 may be held against the planar surface SRF1 by the pressure difference $p_2-p_1$ such that surface SRF2 is movable along the planar surface SRF1 e.g. by a few micrometers e.g. in the direction SX (after opening the chamber, before performing the welding).

Figure 1F:
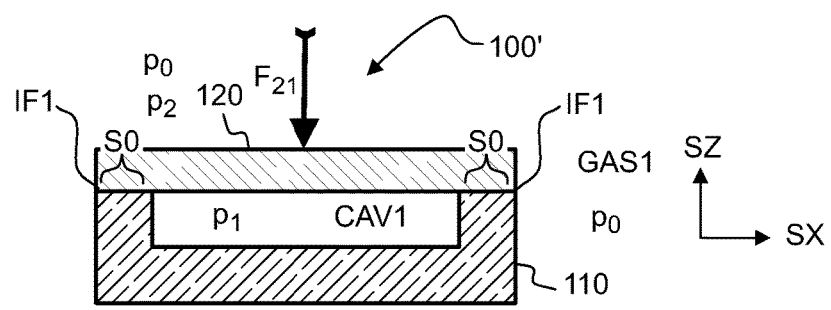
FIG. 1f shows, by way of example, in a cross-sectional view, the semi-manufactured article after the chamber has been opened.

Referring to FIG. 1f, the chamber 200 may be opened after the cavity CAV1 has been closed by forming the preliminary joint S0 between the pieces 110, 120. The external pressure $p_2$ outside the semi-manufactured article 100' may be substantially equal to the ambient pressure $p_0$. The semi-manufactured article 100' may comprise the stacked combination of the pieces 110, 120.

The preliminary joint S0 may allow small relative movement of the piece 120 with respect to the first piece 110 after the chamber 200 has been opened, before performing the welding.

Figure 1G:
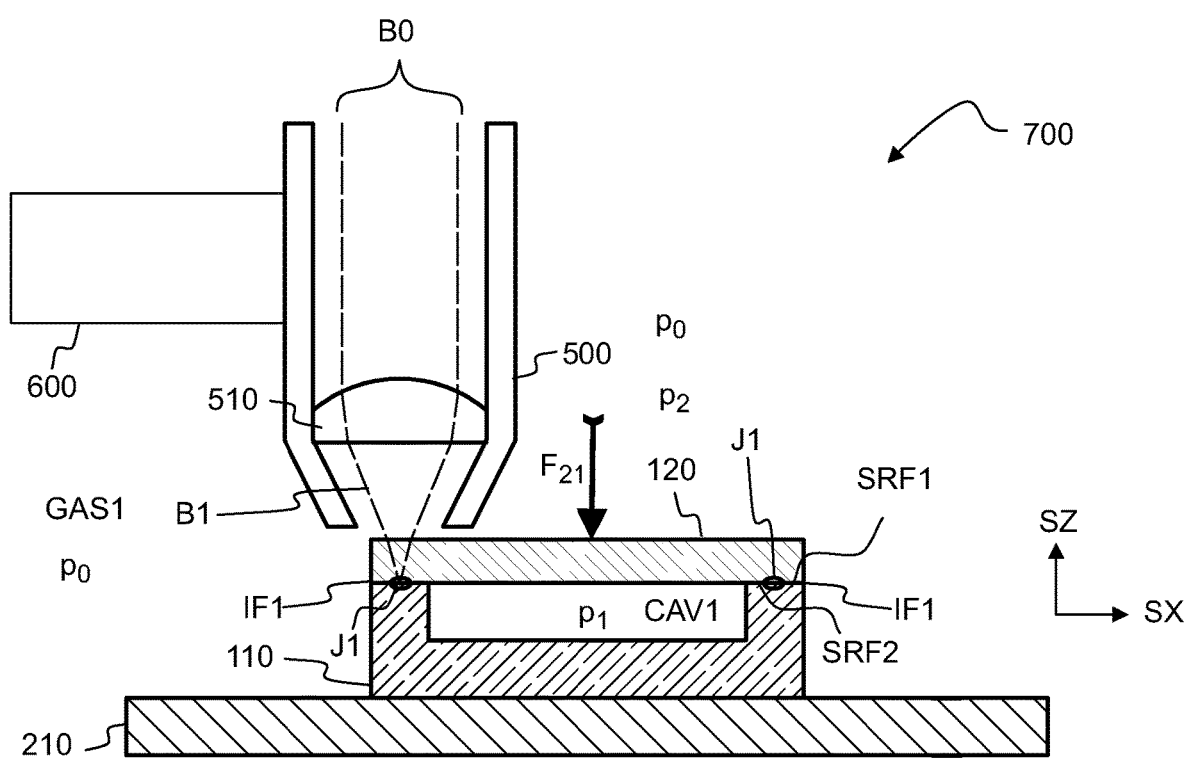
FIG. 1g shows, by way of example, in a cross-sectional view, forming a seam between the first piece and the second piece by laser beam welding.
Figure 2:
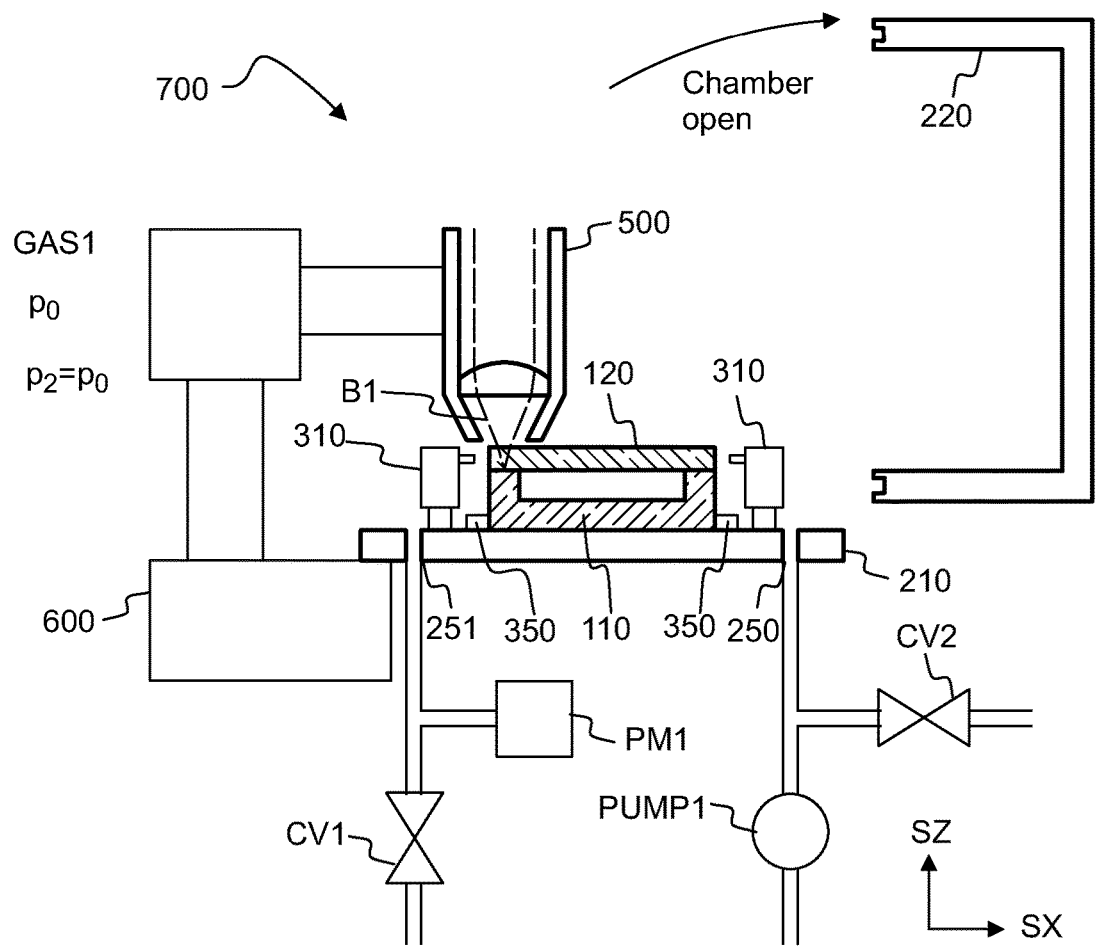
FIG. 2 shows, by way of example, in a cross-sectional view, a laser welding apparatus.

Referring to FIG. 1g and FIG. 2, the second piece 120 may be welded to the first piece 110 by using a laser beam B1. The apparatus 700 may comprise a laser welding unit 500 for forming a welded hermetic seam J1 between the first piece 110 and the second piece 120. The first piece 110 and the second piece 120 may have a common interface IF1. In particular, the first sealing surface SRF1 may be in contact with the second sealing surface SRF2 so as to define a common interface IF1 between the first piece 110 and the second piece 120. A laser welding unit 500 may comprise focusing optics 510 for focusing the laser beam B1 to the common interface IF1. The focusing optics 510 may provide a focused laser beam B1 by focusing light of a primary beam B0. The primary beam B0 may be provided e.g. by using light of a fiber laser. The laser beam B1 may be focused to the interface IF1 e.g. through the piece 110 and/or through the piece 120. The piece 110 and/or the piece 120 may be substantially transparent at the wavelength of the laser beam B1. The laser beam B1 may be pulsed e.g. in order to provide high instantaneous optical intensity at the focal point and/or in order to minimize heating of the material outside the focal spot.

Forming of the hermetic seam J1 may comprise locally melting material of the first piece 110 at a focal point of the laser beam B1 and locally melting material of the second piece 120 at a focal point of the laser beam B1. The laser beam B1 may cause localized fusion of both pieces at the interface IF1. The seam J1 may be formed by re-solidification of the material of the pieces 110, 120. The high intensity of the laser beam B1 may cause nonlinear absorption at the focal point.

The focal point of the laser beam B1 may be moved with respect to the semi-manufactured article 100' such that the seam J1 may encircle the cavity CAV1. The laser unit 500, an optical component of the unit 500, and/or the article 100' may be moved so as to cause the relative movement of the focal point. The seam J1 may be unbroken (contiguous). One or more seams J1 may together encircle the cavity CAV1. One or more seams J1 may together form a closed loop around the cavity CAV1.

The second piece 120 may be held against the first piece 110 by the pneumatic force $F_{21}$ such that it is not necessary to use a contact element for pressing the second piece 120 against the first piece 110 during the laser welding. For example, the contact elements 311 may be optionally moved away from the second piece 120. This may allow substantial freedom to move the semi-manufactured article 100' with respect to the laser welding unit 500 during the laser welding. The laser beam B1 may have unhindered access to substantially all points of the interface IF1. Welding of the interface IF1 with the laser beam B1 may be started e.g. only after the chamber 200 has been opened.

The second piece 120 may be permanently fastened to the first piece 110 with a part of the seam J1 almost immediately after start of the laser welding, such that the second piece 120 cannot be separated from the first piece 110 without causing visually detectable damage to at least one of the pieces 110, 120. Forming of the seam J1 may substantially prevent relative movement of the first sealing surface SRF1 with respect to the second sealing surface SRF2. Forming of the seam J1 may permanently fasten the second piece 120 to the first piece 110 such that the second piece 120 cannot be separated from the first piece 110 without causing visually detectable damage to at least one of the pieces 110, 120.

An actuator 600 may be arranged to move the semi-manufactured article 100' with respect to the laser welding unit 500. The actuator 600 may be e.g. a translation stage or a robot. An actuator 600 may be arranged to move the laser beam B1 with respect to the semi-manufactured article 100'. The actuator 600 may comprise e.g. a robot, a translation stage and/or a scanning optical element.

The semi-manufactured article 100' may be supported e.g. by the base 210 during the laser welding. Alternatively, the semi-manufactured article 100' may be transferred to a different supporting element before starting the welding.

Referring to FIG. 2, the article 100 may be formed from the semi-manufactured article 100' by forming the welded seam J1. The cavity CAV1 of the article 100 may be in a hermetically closed state after the seam J1 has been formed. The absolute pressure $p_1$ of the cavity CAV1 of the article 100 may be e.g. lower than 50 kPa, lower than 1 kPa, lower than 1 Pa, or even lower than $10^{-3}$ Pa.

The welded seam J1 may hermetically join the first piece 110 to the second piece 120. The welded seam J1 may act as a hermetic joint between the first piece and the second piece. The welded seam J1 may act as a permanent hermetic joint. The welded seam J1 may act as a permanent hermetic vacuum joint. The method may comprise forming a hermetic joint J1 between the first piece 110 and the second piece 120. The apparatus may be arranged to form a hermetic joint J1 between the first piece 110 and the second piece 120.

Figure 3:
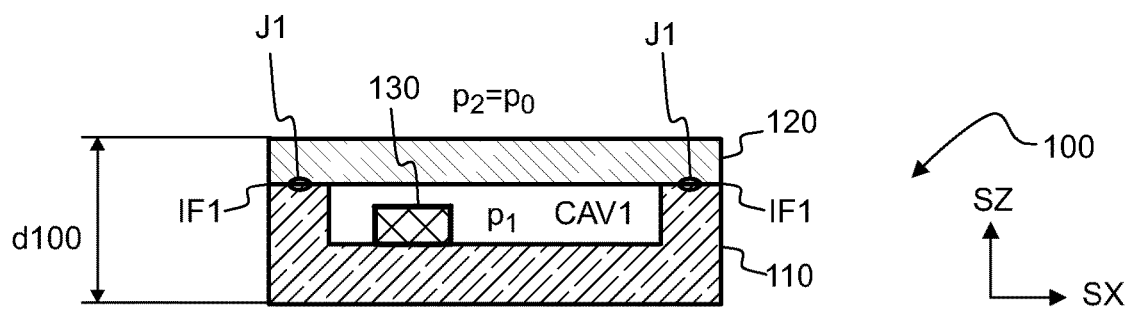
FIG. 3 shows, by way of example, in a cross-sectional view, an article which comprises a component encapsulated in the hermetically closed cavity.

Referring to FIG. 3, the manufactured article 100 may optionally comprise one or more parts 130, which are located in the cavity CAV1. The hermetically closed cavity may protect the part 130 e.g. from atmospheric humidity, from oxygen and/or from aerosol particles. The parts 130 may be mounted or formed in the cavity CAV1. The article 100 may be produced e.g. by using the chamber 200 shown in FIGS. 1a-2. The part 130 may be mounted or formed in the open cavity OCA1 before the cavity OCA1 is closed. The part 130 may be e.g. an electric component, an optical component and/or a mechanical component. The part 130 may comprise an electrical circuit. The part 130 may be e.g. a semiconductor component. The part may comprise e.g. a photodetector. The part may comprise e.g. a laser diode and/or a light emitting diode. The part may comprise an antenna. One or more components 130 may be mounted or formed in the cavity OCA1 before the chamber 200 is closed.

The closed cavity CAV1 may also be arranged to protect other external components from a harmful substance contained in the closed cavity CAV1. For example, the cavity may contain a battery, which may contain corrosive substance.

The part 130 may remain the hermetically closed cavity CAV1 after the hermetic seam J1 has been formed by laser welding. The absolute pressure $p_1$ of the cavity CAV1 of the article 100 may be e.g. lower than 50 kPa, lower than 1 kPa, lower than 1 Pa, or even lower than $10^{-3}$ Pa.

The position of the welded seam J1 may substantially coincide with the position of the preliminary joint S0. The welded seam J1 may be adjacent to the position of the preliminary joint S0. The finished article 100 may comprise one or more welded seams J1. The finished article 100 may comprise two or more welded seams J1.

The thickness d100 of the article 100 after the welding may be substantially equal to the thickness of the semi-manufactured article 100'.

Figure 4:
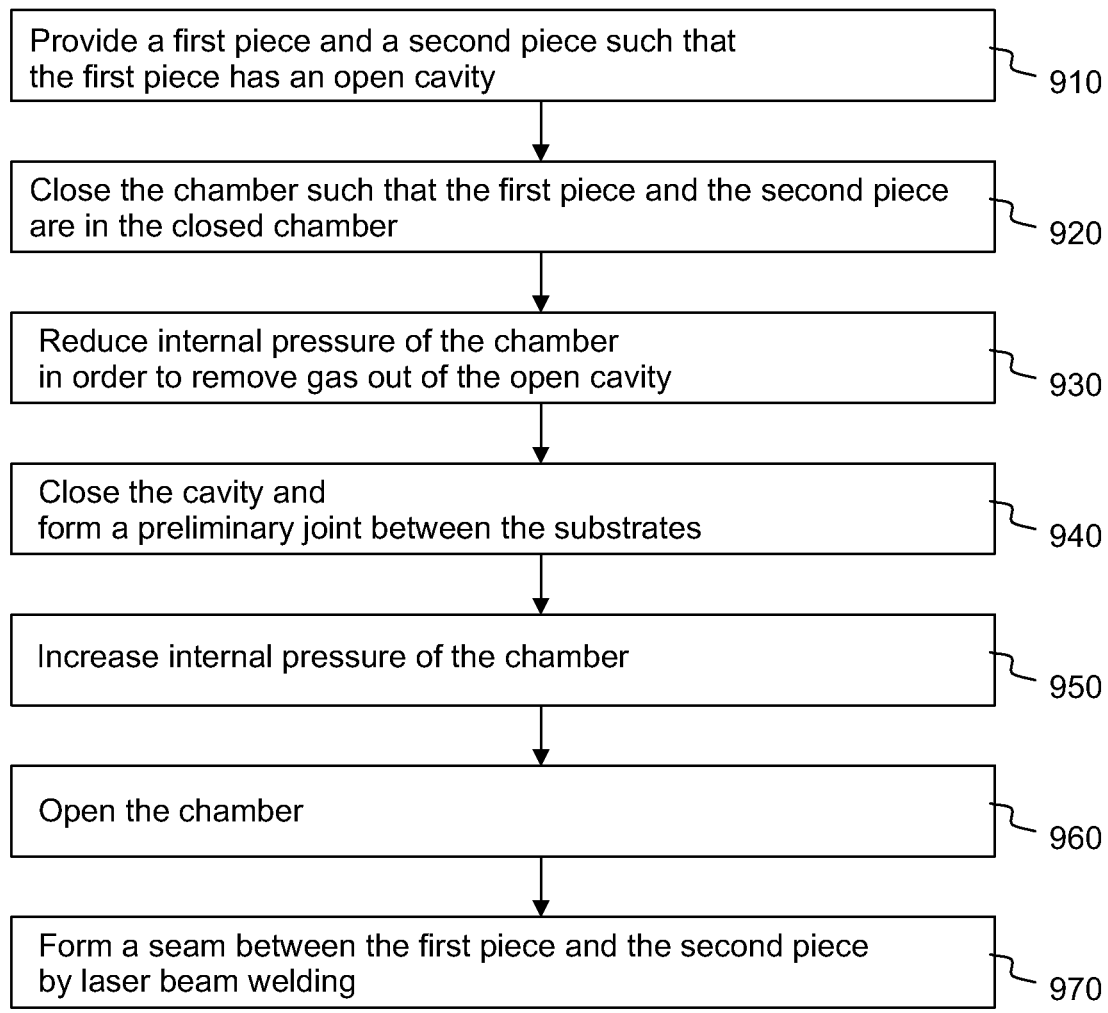
FIG. 4 shows, by way of example, method steps for producing the hermetically closed cavity.

FIG. 4 shows method steps for producing the article 100. The pieces 110, 120 may be provided (step 910). The chamber 200 may be closed such that both pieces 110, 120 are located inside the chamber 200 (step 920). The pressure of the open cavity OCA1 may be reduced after closing the chamber, before closing the cavity (step 930). The preliminary joint S0 may be formed by bringing the mating portions of the sealing surfaces SRF1, SRF2 into contact with each other, after the pressure has been reduced (step 940). The pressure of the chamber 200 may be increased after the cavity has been closed (step 950). The chamber 200 may be opened (step 960). The hermetic seam J1 may be formed by laser welding after the chamber 200 has been opened (step 970).

The production method may comprise:
providing the first piece (110), which comprises an open cavity (OCA1),
providing the second piece (120),
closing a chamber (200) such that the first piece (110) and the second piece (120) are inside the closed chamber (200),
providing a gap (G0) between the first piece (110) and the second piece (120),
changing pressure ($p_2$) of the chamber (200) so as to cause a flow (F1) of a gas (GAS1) from the open cavity (OCA1) through the gap (G0),
closing the open cavity (OCA1) by bringing a first sealing surface (SRF1) of the first piece (110) into contact with a second sealing surface (SRF2) of the second piece (120) such that the first sealing surface (SRF1) forms a preliminary joint (S0) together with the second sealing surface (SRF2), and such that the first piece (110) and the second piece (120) define an interface (IF1),
opening the chamber (200) after the preliminary joint (S0) has been formed, and
forming a welded seam (J1) by focusing a laser beam (B1) through the second piece (120) to the interface (IF1).

The method may optionally comprise one or more additional method steps between opening the chamber 200 (step 960) and performing the laser welding (step 970). For example, the method may comprise removing a protective film from an outer surface of the piece 110, 120 after opening the chamber but before starting the laser welding.

Figure 5:
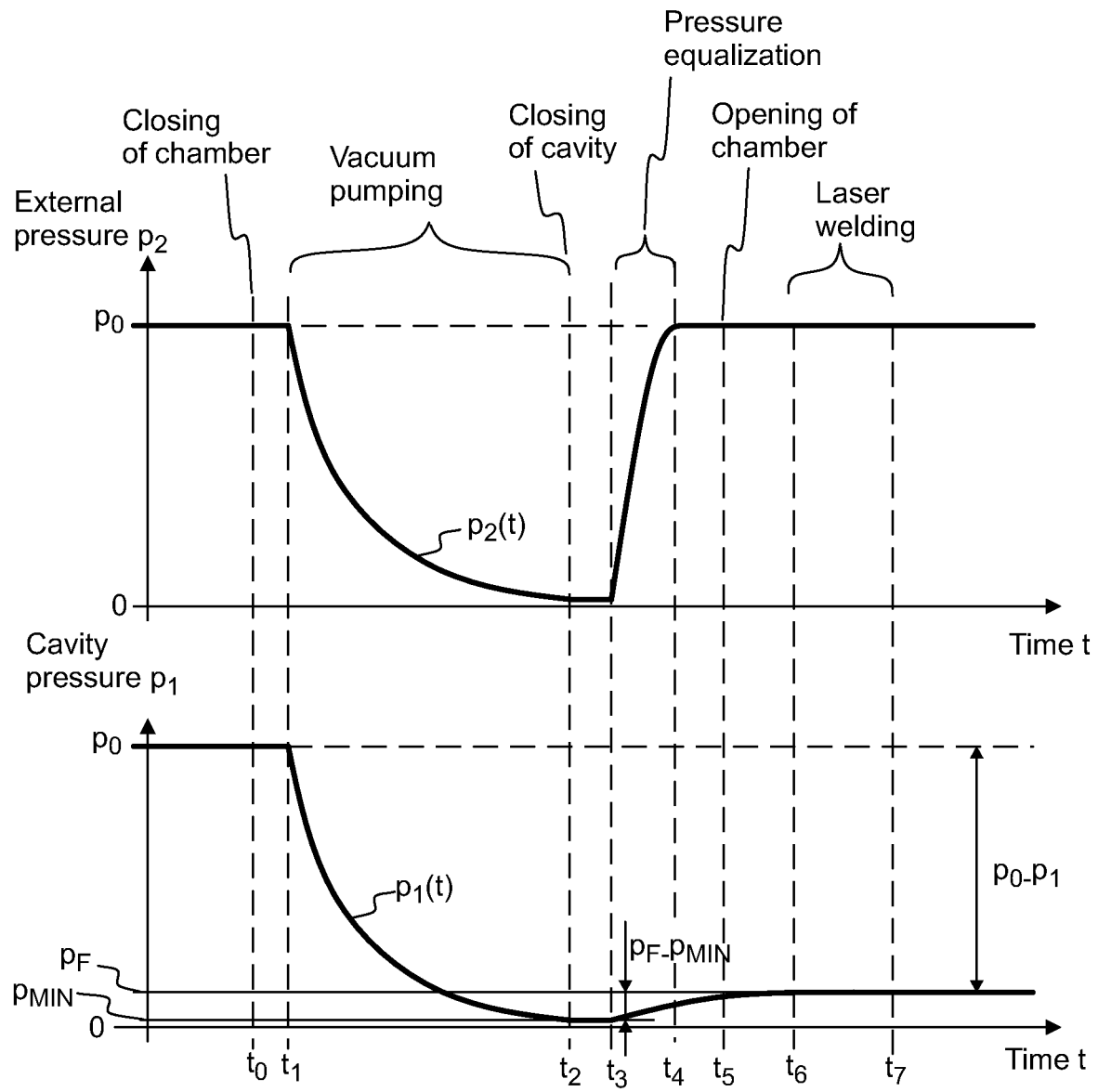
FIG. 5 shows, by way of example, temporal evolution of external pressure and temporal evolution of cavity pressure.

FIG. 5 shows, by way of example, temporal evolution of cavity pressure $p_1$ and temporal evolution of external pressure $p_2$ during manufacturing of the article 100.

The pressure $p_1$ of the open cavity OCA1 and the external pressure $p_2$ may initially be equal to the ambient pressure $p_0$. The chamber 200 may be closed at a time $t_0$. Reduction of the chamber pressure $p_2$ may be started at the time $t_1$. The pressure $p_2$ may refer to the internal pressure of the chamber 200 during the time period when the chamber 200 is in the closed state.

The external pressure $p_2$ may reach a minimum value $p_{MIN}$ e.g. at a time $t_2$. Gas (GAS0 or GAS1) may be removed from the open cavity OCA1 during the time period from $t_1$ to $t_2$ such that the pressure $p_1$ of the cavity may be substantially equal to the external pressure $p_2$ at the time $t_2$. The minimum value of the cavity pressure $p_1$ may also be substantially equal to $p_{MIN}$. The gap G0 may be closed at the time $t_2$. The preliminary joint S0 may be formed at the time $t_2$. The pressure $p_2$ may be increased during a time period from $t_3$ to $t_4$, after the preliminary joint S0 has been formed. The chamber 200 may be opened at a time $t_5$. The laser welding may be performed during a time period from $t_6$ to $t_7$, after the chamber 200 has been opened. The hermetic seam J1 may be fully completed at the time $t_7$. $p_F$ may denote the final internal pressure of the hermetically closed cavity CAV1.

The second piece 110 may be held against the first piece 120 by van der Waals forces and/or by the pneumatic force $F_{21}$ caused by the pressure difference $p_0 - p_1$.

A relative pressure difference $((p_0-p_1)/p_0)$ between external pressure ($p_0$) and the pressure ($p_1$) of the cavity (CAV1) may be e.g. greater than 50% when the chamber (200) is opened. The pressure difference ($p_2-p_1$) between outer and inner surfaces of the second piece 120 may be e.g. greater than 50 kPa during forming the welded seam J1.

The preliminary joint S0 is gas tight to a certain degree, but the preliminary joint S0 is not hermetic. The preliminary joint S0 may allow a small leakage of ambient gas into the closed cavity CAV1 when the chamber 200 is opened. The preliminary joint S0 may allow a small leakage of ambient gas into the closed cavity CAV1 during the time period from $t_3$ to $t_7$. The difference $p_F - p_{MIN}$ between the final pressure $p_F$ and the minimum pressure $p_{MIN}$ may be e.g. smaller than 1%, or even smaller than 0.01% of the ambient pressure $p_0$.

The preliminary joint S0 may be a partially gas tight joint before forming the welded seam J1 such that the relative rate of change $(\Delta p_1/\Delta t)/(p_0-p_1)$ of pressure ($p_1$) of the closed cavity (CAV1) is e.g. smaller than 0.01/s immediately after the chamber (200) has been opened. The shapes of the sealing surfaces SRF1, SRF2 may be selected such that the preliminary joint S0 is a partially gas tight joint.

The opening of the chamber 200 and/or the laser welding may be performed at the ambient pressure $p_0$. In particular, opening of the chamber 200 and/or the laser welding may be performed at the ambient pressure $p_0$ and in an inert gas atmosphere so as to ensure that only inert gas is allowed to leak into the closed cavity CAV1 before the hermetic welded seam J1 is fully completed.

The welding may be performed soon after the chamber 200 has been opened, in order to reduce or minimize leakage through the preliminary joint S0. A time period ($t_7-t_5$) between opening the chamber 200 and forming the hermetic seam J1 may be e.g. shorter than 10 h, shorter than 1 h, or shorter than 1000 s. The time period ($t_7-t_5$) may be e.g. shorter than 100 s, shorter than 10 s, or even shorter than 1 s in order to minimize leakage. A time period ($t_7-t_3$) between start of pressure increase and completion of the hermetic seam J1 may be e.g. shorter than 10 h, shorter than 1 h, or shorter than 1000 s. The time period ($t_7-t_3$) may be e.g. shorter than 100 s, shorter than 10 s, or even shorter than 1 s in order to minimize leakage.

The temperature of the pieces may be kept near an intended operating temperature of the article during the laser welding, e.g. in order to reduce outgassing and internal stress. The temperature of the cavity may be kept in a predetermined temperature range during the laser welding. The temperature of the surface of the cavity may be kept e.g. below 80° C. during the welding. The temperature of the surface of the cavity may be kept e.g. in the range of 0° C. to 50° C. during the welding. The temperature of the surface of the cavity may be kept near the intended operating temperature during the laser welding. The intended operating temperature may be e.g. substantially equal to the room temperature (e.g. 25° C.).

The spatially averaged temperature of the first piece and the spatially averaged temperature of the second piece may remain below 80° C. during the welding. The spatially averaged temperature of the first piece and the spatially averaged temperature of the second piece may remain in the range of 0° C. to 50° C. during the welding. The spatially averaged temperature of the first piece and the spatially averaged temperature of the second piece may remain substantially equal to 25° C. during the welding. A change of spatially averaged temperature of the first piece and a change of spatially averaged temperature of the second piece may remain e.g. smaller than 5° C. during the welding with the laser beam.

Performing the welding near the intended operating temperature may improve operating reliability of the article also when the thermal expansion coefficient of the material of the first piece is substantially different from the thermal expansion coefficient of the material of the second piece. The ratio of the thermal expansion coefficient of the material of the first piece to the thermal expansion coefficient of the material of the second piece may be e.g. lower than ⅓ or higher than 3.

Thermal expansion coefficients of the pieces 110, 120 may also be matched in order to reduce internal stress during use of the article 100. The article 100 may be used e.g. in conditions where the article 100 experiences thermal cycling. Matching of the thermal expansion coefficients of the pieces may further improve operating reliability of the article 100.

Figure 6:
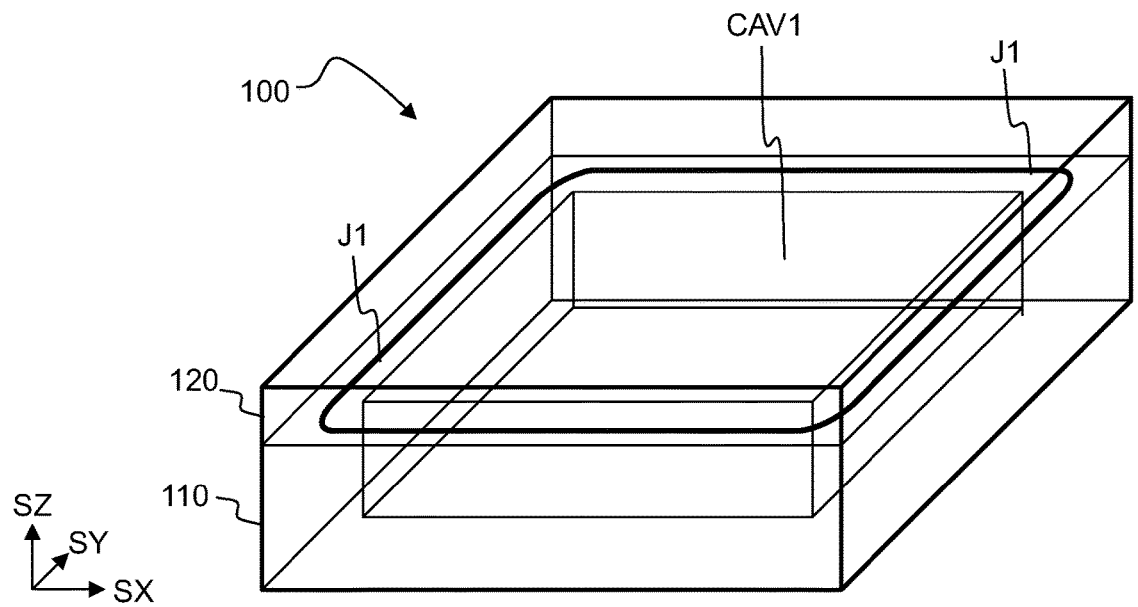
FIG. 6 shows, by way of example, in a three dimensional view, an article, which comprises a hermetically closed cavity.

FIG. 6 shows, by way of example, an article 100 produced by the method steps discussed with reference to FIGS. 1a to 5.

Figure 7:
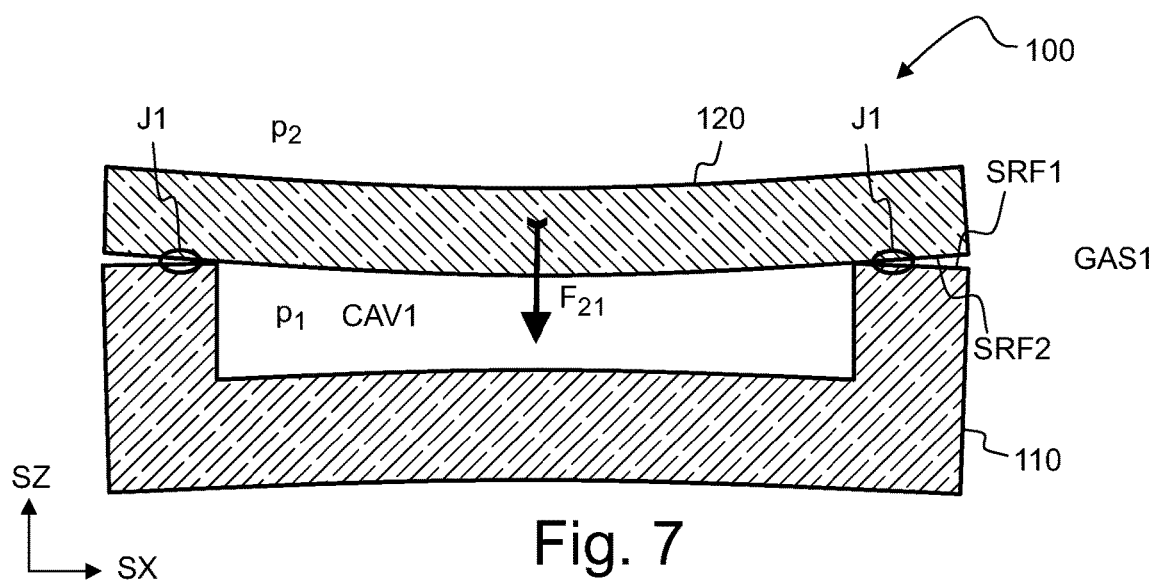
FIG. 7 shows, by way of example, in a cross-sectional view, deformation caused by a difference between external pressure and internal pressure.

FIG. 7 shows, by way of example, geometric deformation of the article 100 caused by the pressure difference $p_0-p_1$. The pressure difference $p_0-p_1$ may cause the pneumatic force $F_{21}$, which may also slightly bend the pieces 110, 120. Bending of the piece 120 may cause a microscopic transverse displacement of the second piece 120 with respect to the first piece 110 (e.g. in the direction SX). Performing the laser welding under the deformed state may facilitate minimizing internal stress of the article 100. Performing the laser welding such that the cavity pressure $p_1$ is lower than the external pressure $p_2$ during the welding may facilitate reducing or minimizing residual internal stress of the material of the article 100. Performing the welding substantially at the ambient pressure ($p_0$=100 kPa) and utilizing the pressure difference $p_0-p_1$ during the welding may improve operating reliability of the article 100 for operating conditions where the article 100 will be subjected to said ambient pressure ($p_0$=100 kPa).

Figure 8A:
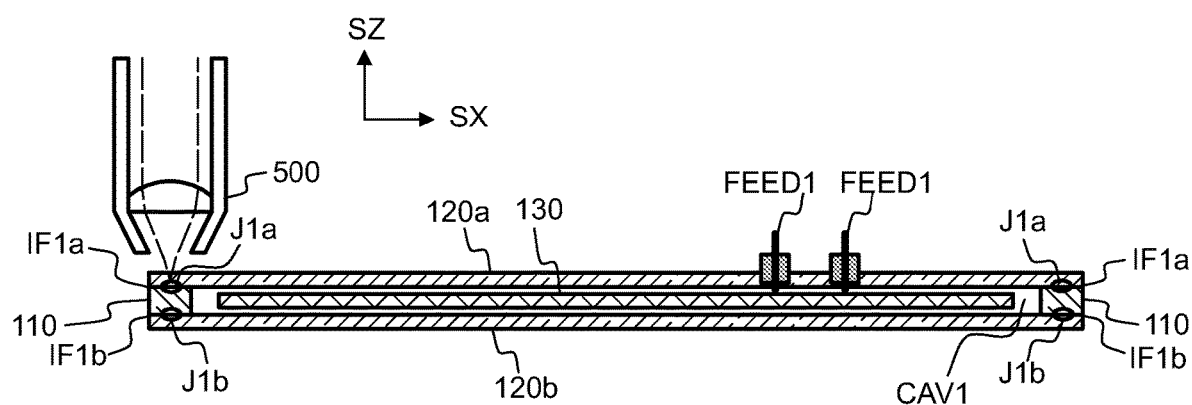
FIG. 8a shows, by way of example, in a cross-sectional view, forming a seam between a first piece and a second piece by laser welding.

The article 100 may be formed from two or more pieces. FIG. 8a shows, by way of example, forming an article 100 by joining three pieces 110, 120a, 120b together by laser welding. The article 100 may comprise pieces 110, 120a, 120b, and a component 130. The first piece 110 may e.g. a spacer piece. The spacer piece may have one or more openings, i.e. open cavities. The second piece 120a may be e.g. a first cover. The third piece 120b may be e.g. a second cover. One or more components 130 may be mounted in the open cavity. The open cavity of the piece 110 may be closed after the pieces 110, 120a, 120b have been positioned in the chamber 200 and after gas has been removed from the open cavity. A first preliminary joint may be formed by bringing a sealing surface of the second piece 120a into contact with a first sealing surface of the piece 110. A second preliminary joint may be formed by bringing a sealing surface of the third piece 120b into contact with a second sealing surface of the piece 110. The chamber 200 may be opened after the cavity has been closed. A first seam J1a may be formed by the laser welding to permanently join the second piece 120a to the first piece 110. A second seam J1b may be formed by the laser welding to permanently join the third piece 120b to the first piece 110.

One or more of the pieces may comprise electronic feedthrough FEED1. The feedthrough FEED1 may provide a galvanic electrical connection from the outside of the article 100 to the hermetically encapsulated component 130.

Figure 8B:
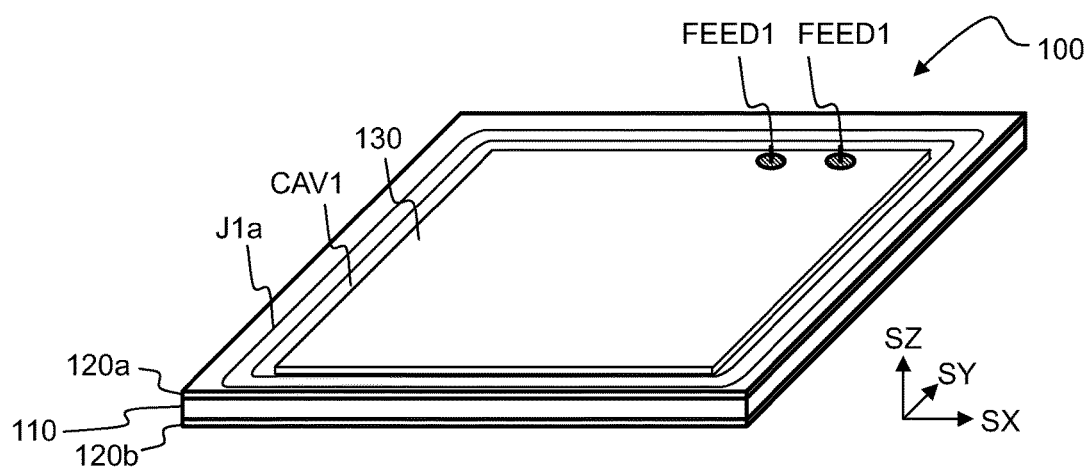
FIG. 8b shows, by way of example, in a three dimensional view, an article, which comprises a component enclosed in a hermetically closed cavity.

FIG. 8b shows an article 100, which may be formed e.g. by the method shown in FIG. 8a. The article 100 may comprise one or more components 130, which are hermetically enclosed in the cavity CAV1 of the article 100. The pressure of the cavity CAV1 may be e.g. lower than 50 kPa. The cavity CAV1 may optionally comprise inert gas. The article 100 may comprise substantially planar covers 120a, 120b, which have been joined to a spacer piece 110 by laser welding.

The article 100 may be e.g. a display, which comprises an array of Organic Light Emitting Diodes (OLED). The component 130 may comprise an array of light emitting diodes. The component 130 may be hermetically encapsulated by joining together two or more pieces 110, 120a, 120b.

Figure 9A:
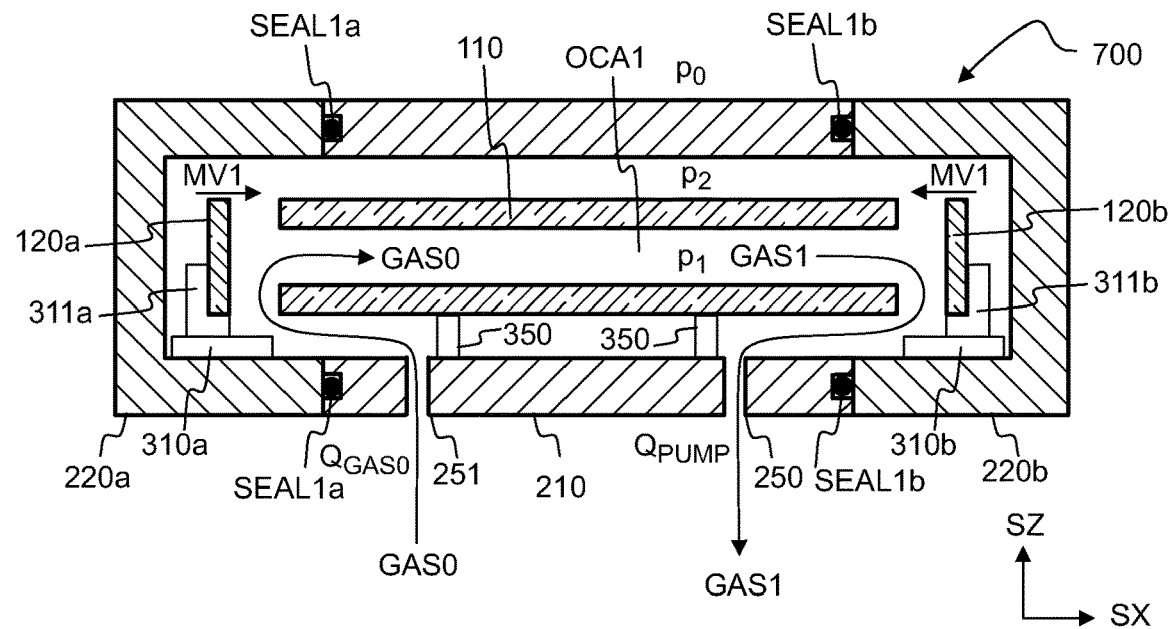
FIG. 9a shows, by way of example, in a cross-sectional view, removing gas from an open cavity of a tubular piece.
Figure 9B:
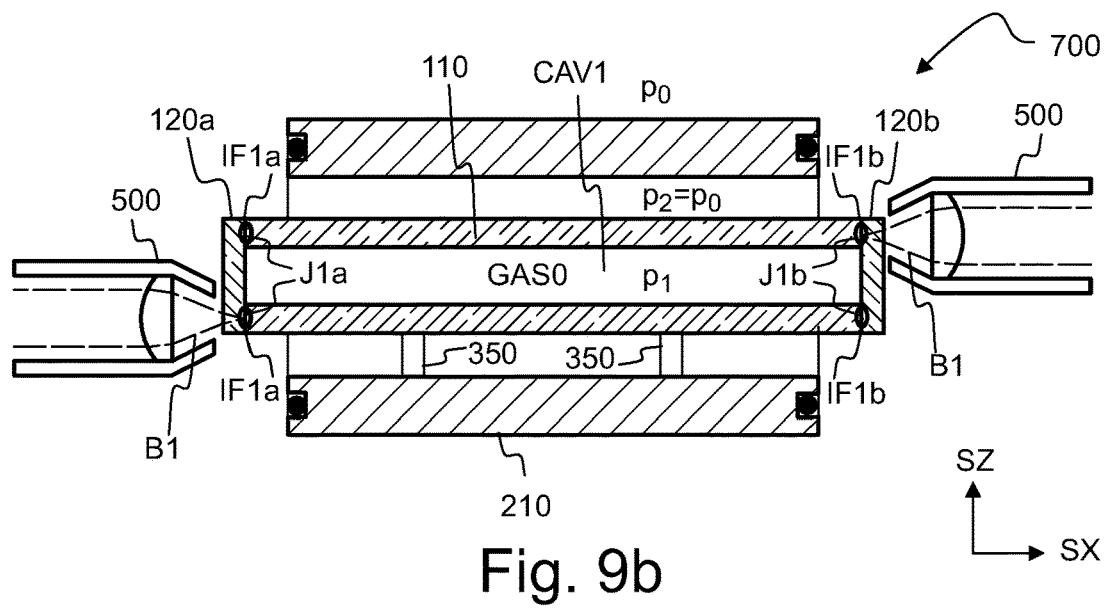
FIG. 9b shows, by way of example, in a cross-sectional view, closing the cavity of the tubular piece by laser welding.
Figure 9C:
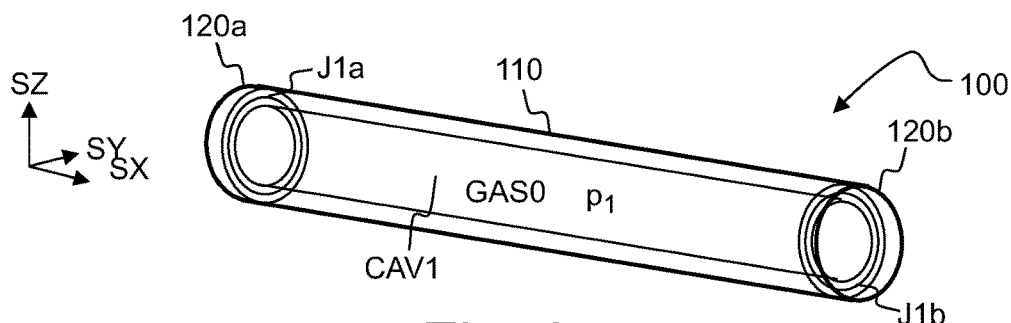
FIG. 9c shows, by way of example, in a three dimensional view, an article, which comprises a hermetically closed cavity.

Referring to FIGS. 9a to 9c, the article 100 may be an elongated and/or cylindrical object. The article 100 may be produced by joining two or more pieces 110, 120a, 120b together by laser welding. The first piece 110 may be e.g. a tube section, and the pieces 120a, 120b may be plates. The pieces 110, 120a, 120b may be positioned in the chamber 200 in order to remove gas GAS1, GAS0 from the interior OCA1 of the tube 110. The interior OCA1 of the tube 110 may be optionally flushed with inert gas GAS0.

The cavity OCA1 may be closed at the reduced pressure of the chamber 200. A first actuator 310a and a first supporting element 311a may move the piece 120a so as to close a first end of the tube 110. A second actuator 310b and a second supporting element 311b may move the piece 120b so as to close the second end of the tube 110.

The chamber 200 may comprise two or more parts 210, 220a, 220b. For example, a base part 210 of the chamber 200 may be closed by a first end part 220a, and by a second end part 220b. The closed chamber 200 may be sealed e.g. by seals SEAL1a, SEAL1b. The chamber 200 may be opened after the cavity OCA1 of the tube 110 has been closed. The tube 110 may be held in place e.g. by positioning elements 350.

After opening the chamber 200, the semi-manufactured article 100' may comprise a first interface IF1a and a second interface IF1b. The first interface IF1a may be defined by mating contact surfaces of the pieces 110, 120a. The second interface IF1a may be defined by mating contact surfaces of the pieces 110, 120b. The pieces 110, 120a may together form a first preliminary joint. The pieces 110, 120b may together form a second preliminary joint.

Referring to FIG. 9b, a first seam J1a may be formed by the laser welding to permanently join the second piece 120a to the first piece 110. A second seam J1b may be formed by the laser welding to permanently join the third piece 120b to the first piece 110.

Referring to FIG. 9c, the article 100 may be e.g. a (long) cylindrical object. The article 100 may be formed e.g. according to FIGS. 9a and 9b. The article 100 may be produced e.g. by closing both ends of a glass tube 110 with circular plates 120a, 120b, wherein the glass tube may be used as the first piece, and a circular plate may be used as the second piece.

The article 100 may optionally comprise a component 130, which may be positioned inside the piece 110 before the cavity is closed.

The second circular plate 120b may also be welded to the end of the tube 110 also before the tube 110 is inserted into the chamber 200. In an embodiment, the piece 110 may also have a closed end already before the piece 110 is positioned into the chamber 200.

In general, the open cavity OCA1 of a piece 110 may be closed by moving at least one of the pieces 110, 120. For example, the cavity may be closed by lowering or dropping the second piece 120 onto the first piece. For example, the cavity may be closed by lifting the piece 110 into contact with the second piece 120. For example, the cavity may be closed by tilting the piece 110 and/or 120.

The article 100 may be e.g. an optical device, and/or electrical device. The article may be e.g. a solar cell. The article 100 may be e.g. an OLED display.

The size of the focal spot of the laser beam B1 may be e.g. in the range of 1 to 10 µm. The height dimension of the seam J1 may be e.g. in the range of 1 to 500 µm (in the direction perpendicular to the surface SRF1), and a transverse dimension of the seam J1 may be e.g. in the range of 1 to 100 µm.

The method may be used for mass production of a plurality of articles. For example, pieces for forming a plurality of articles may be simultaneously located the same chamber 200 when the chamber is closed and opened. For example, gas may be removed from a cavity OCA1 of a second article 100 in the vacuum chamber 200 during laser welding of a first (previous) article 100.

The pieces 110, 120 may be substantially homogeneous or the piece 110, 120 may comprise two or more different materials. The pieces 110, 120 may comprise two or more different materials such that the sealing surfaces SRF1, SRF2 consist essentially of glass.

The first piece 110 may comprise glass. The second piece 120 may comprise glass. The first piece 110 and/or the second piece 120 may consist essentially of glass. The first piece 110 and the second piece 120 may consist essentially of glass. The glass may be e.g. fused silica or borosilicate glass. The glass may consist of non-crystalline amorphous solid. The softening temperature of the glass may be e.g. higher than 500° C.

The glass pieces 110, 120 may comprise two or more different materials such that more than 95% of the mating surface area of the sealing surfaces SRF1, SRF2 consists essentially of glass. For example, more than 95% of the mating surface area of the sealing surfaces SRF1, SRF2 may consist essentially of glass such that the remaining mating area of the sealing surface SRF1 and/or SRF2 may be essentially metallic. The welded seam J1 may comprise one or more portions where glass is welded to a metal. The metal may be e.g. gold or silver.

The material of the first sealing surface SRF1 may be selected from a group consisting of glass, silicon, sapphire, and ceramic. The material of the second sealing surface SRF2 may be selected from a group consisting of glass, silicon, sapphire, and ceramic.

A material of the first piece may be glass, silicon, sapphire, or ceramic. A material of the second piece may be glass, silicon, sapphire, or ceramic. The seam may be formed from said material of the first piece and from said material of the second piece.

One or more outer surfaces of the article 100 and/or the inner surface of the cavity may further comprise other material than glass. An outer surface of the article 100 and/or the inner surface of the cavity may comprise e.g. metallic material.

An article 100 produced by the method may also comprise two or more cavities which are hermetically isolated from each other.

The piece 110 and/or the piece 120 may also be called e.g. as substrates.

The article 100 may be e.g. an optical device, and/or electrical device. The article may be e.g. a solar cell. The article 100 may be e.g. a display. The component 130 may comprise an array of light emitting diodes. The article 100 may be e.g. a display, which comprises an array of Organic Light Emitting Diodes (OLED). The article 100 may be e.g. an OLED display. The component 130 may be hermetically encapsulated by joining together two or more pieces 110, 120, 120a, 120b.

The component 130 may comprise one or more light emitting elements. The component 130 may comprise a single light emitting element or a plurality of light emitting elements. The component 130 may comprise an array of light emitting elements. The light emitting element or elements may be e.g. a light emitting diode (LED), or a laser emitter. The laser emitter may be e.g. a semiconductor laser. The laser emitter may be e.g. a vertical-cavity surface-emitting laser (VCSEL). The light emitting diode may be e.g. an organic light emitting diode (OLED).

The article 100 may be e.g. an image sensor. A digital camera may comprise an image sensor 100 for capturing digital images. The image sensor 100 may comprise an encapsulated component 130, which may convert an optical image into a digital image. The component 130 may comprise e.g. an array of CMOS detectors or an array of CCD detectors. CMOS means Complementary Metal Oxide Semiconductor. CCD means Charge-Coupled Device.

The article 100 may be e.g. a temperature measurement device, a MEMS device, an atomic clock device, and/or an implantable medical device. MEMS means a microelectromechanical system.

The encapsulated component 130 may be e.g. an optical element. The optical element may comprise e.g. one or more reflective layers, one or more wavelength-selective layers, one or more diffractive microstructures, and/or one or more optical multilayer coatings.

The piece 110 and/or the piece 120 may comprise one or more reflective layers, one or more wavelength-selective layers, one or more diffractive microstructures, and/or one or more optical multilayer coatings.

The article 100 may be e.g. a pressure measurement device. The article 100 may be arranged to monitor temporal variations of external pressure p(t). The symbol t may denote time. The article 100 may be used as a pressure sensor for monitoring external pressure p(t) after the article 100 has been produced. The piece 110 and/or 120 may be slightly deformed when exposed to external pressure p(t). The degree of bending of the piece 110 and/or 120 may depend on the pressure difference $p(t)-p_1$ between external pressure p(t) and internal pressure $p_1$. The relative position of a surface of the piece 110 or 120 may depend on the pressure difference $p(t)-p_1$, wherein the relative position may be determined e.g. with respect to the other piece (120 or 110). The article 100 may optionally comprise a component 130, which may be arranged to monitor the pressure-dependent position of the piece 110 or 120. The component 130 may be arranged to form an electrical signal, optical signal and/or radio frequency electromagnetic signal indicative of the pressure difference p(t)−$p_1$. The component 130 may be encapsulated inside the article 100. Producing the article 100 according to the present method may reduce internal stress of the pieces 110, 120 and/or may improve operating reliability of the article 100.

Various aspects are illustrated by the following examples.

Example 1. A method for producing an article (100) by welding a first piece (110) to a second piece (120), the method comprising:
  providing the first piece (110), which comprises an open cavity (OCA1) and a first sealing surface (SRF1),
  providing the second piece (120), which comprises a second sealing surface (SRF2),
  providing a chamber (200), which has controllable internal pressure ($p_2$),
  closing the chamber (200) such that the first piece (110) and the second piece (120) are inside the closed chamber (200),
  changing the internal pressure ($p_2$) of the chamber (200) so as to cause a flow (F1) of a gas (GAS1) from the open cavity (OCA1),
  closing the open cavity (OCA1) by moving at least one of the pieces (110, 120) such that the first sealing surface (SRF1) forms a preliminary joint (S0) together with the second sealing surface (SRF2), and such that the first piece (110) and the second piece (120) define an interface (IF1),
  opening the chamber (200) after the preliminary joint (S0) has been formed, and
  forming a welded seam (J1) by focusing a laser beam (B1) to the interface (IF1) after the chamber (200) has been opened.

Example 2. The method of example 1, wherein a pressure difference ($p_2$−$p_1$) between outer and inner surfaces of the second piece (120) is greater than 50 kPa during forming the welded seam (J1).

Example 3. The method of example 1 or 2, wherein the preliminary joint (S0) allows relative movement of the first sealing surface (SRF1) with respect to the second sealing surface (SRF2) before forming the welded seam (J1).

Example 4. The method according to any of the examples 1 to 3 wherein the preliminary joint (S0) is a partially gas tight joint before forming the welded seam (J1) such that the relative rate of change ($\Delta p_1/\Delta t$)/($p_0$−$p_1$) of pressure ($p_1$) of the closed cavity (CAV1) is smaller than 0.01/s immediately after the chamber (200) has been opened.

Example 5. The method according to any of the examples 1 to 4, wherein a time period ($t_7$−$t_5$) between opening the chamber (200) and forming a hermetic seam (J1) is shorter than 100 s, advantageously shorter than 10 s, and preferably shorter than 1 s.

Example 6. The method according to any of the examples 1 to 5 wherein the first sealing surface (SRF1) and the second sealing surface (SRF2) are substantially planar.

Example 7. The method according to any of the examples 1 to 6 wherein a relative pressure difference (($p_0$−$p_1$)/$p_0$) between external pressure ($p_0$) and the pressure ($p_1$) of the closed cavity (CAV1) is greater than 90% when the chamber (200) is opened.

Example 8. The method according to any of the examples 1 to 8 wherein the temperature of the surface of the cavity (CAV1) remains lower than 80° C. during forming the welded seam (J1).

Example 9. The method according to any of the examples 1 to 9 wherein a material of the first piece (110) has been selected from a group consisting of glass, silicon, sapphire, and ceramic, the material of the second piece (120) has been selected from a group consisting of glass, silicon, sapphire, and ceramic, and wherein the seam is formed from the material of the first piece (110) and from the material of the second piece (120).

Example 10. The method according to any of the examples 1 to 9 wherein the article (100) comprises one or more components (130), which are located in the closed cavity (CAV1).

Example 11. The method according to any of the examples 1 to 9 wherein the laser beam (LB1) is focused to the interface (IF1) through the first piece (110) and/or through the second piece (120).

Example 12. An apparatus (700) for producing an article (100) from a first piece (110) and from a second piece (120), wherein the first piece (110) comprises an open cavity (OCA1) and a first sealing surface (SRF1), the second piece (120) comprises a second sealing surface (SRF2), the apparatus (700) comprises a chamber (200) and a laser welding unit (500), wherein the apparatus (700) is arranged to:
  cause a flow (F1) of a gas (GAS1) from the open cavity (OCA1) by changing the internal pressure ($p_2$) of the chamber (200) when the pieces (110, 120) are located in the in the closed chamber (200),
  move at least one of the pieces (110, 120) in the closed chamber (200) in order to close the open cavity (OCA1) such that the first sealing surface (SRF1) forms a preliminary joint (S0) together with the second sealing surface (SRF2), and such that the first piece (110) and the second piece (120) define an interface (IF1), and
  form a welded seam (J1) by focusing a laser beam (B1) to the interface (IF1) after the chamber (200) has been opened.

For the person skilled in the art, it will be clear that modifications and variations of the methods and the devices according to the present invention are perceivable. The figures are schematic. The particular embodiments described above with reference to the accompanying drawings are illustrative only and not meant to limit the scope of the invention, which is defined by the appended claims.

The invention claimed is:

1. A method for producing an article by welding a first piece to a second piece, the method comprising:
  providing the first piece, which comprises an open cavity and a first sealing surface,
  providing the second piece, which comprises a second sealing surface,
  providing a chamber, which has controllable internal pressure,
  closing the chamber such that the first piece and the second piece are inside the closed chamber,
  changing the internal pressure of the chamber so as to cause a flow of a gas from the open cavity,
  closing the open cavity by moving at least one of the pieces such that the first sealing surface forms a partially gas tight preliminary joint together with the second sealing surface, and such that the first piece and the second piece define an interface,
  opening the chamber after the preliminary joint has been formed, and
  forming a welded seam by focusing a laser beam to the interface after the chamber has been opened,
  wherein the partially gas tight preliminary joint is not hermetic before the welded seam is formed,
  wherein the first sealing surface and the second sealing surface are planar, and wherein a pressure difference between outer and inner surfaces of the second piece is greater than 50 kPa during forming the welded seam.

2. The method of claim 1, wherein the preliminary joint allows relative movement of the first sealing surface with respect to the second sealing surface before forming the welded seam.

3. The method according to claim 1, wherein the preliminary joint is a partially gas tight joint before forming the welded seam such that the relative rate of change of pressure of the closed cavity is less than 1% per second immediately after the chamber has been opened.

4. The method according to claim 1, wherein a time period between opening the chamber and forming a hermetic seam is less than 100 s.

5. The method according to claim 1, wherein a relative pressure difference between external pressure and the pressure of the closed cavity is greater than 90% when the chamber is opened.

6. The method according to claim 1, wherein the temperature of the surface of the cavity remains lower than 80° C. during forming the welded seam.

7. The method according to claim 1, wherein a material of the first piece has been selected from a group consisting of glass, silicon, sapphire, and ceramic, the material of the second piece has been selected from a group consisting of glass, silicon, sapphire, and ceramic, and wherein the seam is formed from the material of the first piece and from the material of the second piece.

8. The method according to claim 1, wherein the article comprises one or more components, which are located in the closed cavity.

9. The method according to claim 1, wherein the laser beam is focused to the interface through the first piece and/or through the second piece.

10. A method for producing an article by welding a first piece to a second piece, the method comprising:
    providing the first piece, which comprises an open cavity and a first sealing surface,
    providing the second piece, which comprises a second sealing surface,
    providing a chamber, which has controllable internal pressure,
    closing the chamber such that the first piece and the second piece are inside the closed chamber,
    changing the internal pressure of the chamber so as to cause a flow of a gas from the open cavity,
    closing the open cavity by moving at least one of the pieces such that the first sealing surface forms a partially gas tight preliminary joint together with the second sealing surface, and such that the first piece and the second piece define an interface,
    opening the chamber after the preliminary joint has been formed, and
    forming a welded seam by focusing a laser beam to the interface after the chamber has been opened,
    wherein the partially gas tight preliminary joint is not hermetic before the welded seam is formed,
    wherein the first sealing surface and the second sealing surface are planar, and wherein a time period between opening the chamber and forming a hermetic seam is less than 100 s.

11. A method for producing an article by welding a first piece to a second piece, the method comprising:
    providing the first piece, which comprises an open cavity and a first sealing surface,
    providing the second piece, which comprises a second sealing surface,
    providing a chamber, which has controllable internal pressure,
    closing the chamber such that the first piece and the second piece are inside the closed chamber,
    changing the internal pressure of the chamber so as to cause a flow of a gas from the open cavity,
    closing the open cavity by moving at least one of the pieces such that the first sealing surface forms a partially gas tight preliminary joint together with the second sealing surface, and such that the first piece and the second piece define an interface,
    opening the chamber after the preliminary joint has been formed, and
    forming a welded seam by focusing a laser beam to the interface after the chamber has been opened,
    wherein the partially gas tight preliminary joint is not hermetic before the welded seam is formed,
    wherein the first sealing surface and the second sealing surface are planar, and wherein a relative pressure difference between external pressure and the pressure of the closed cavity is greater than 90% when the chamber is opened.

12. A method for producing an article by welding a first piece to a second piece, the method comprising:
    providing the first piece, which comprises an open cavity and a first sealing surface,
    providing the second piece, which comprises a second sealing surface,
    providing a chamber, which has controllable internal pressure,
    closing the chamber such that the first piece and the second piece are inside the closed chamber,
    changing the internal pressure of the chamber so as to cause a flow of a gas from the open cavity,
    closing the open cavity by moving at least one of the pieces such that the first sealing surface forms a partially gas tight preliminary joint together with the second sealing surface, and such that the first piece and the second piece define an interface,
    opening the chamber after the preliminary joint has been formed, and
    forming a welded seam by focusing a laser beam to the interface after the chamber has been opened,
    wherein the partially gas tight preliminary joint is not hermetic before the welded seam is formed,
    wherein the first sealing surface and the second sealing surface are planar, and wherein the temperature of the surface of the cavity remains lower than 80° C. during forming the welded seam.

* * * * *